(12) United States Patent
Hoffman

(10) Patent No.: US 7,758,915 B2
(45) Date of Patent: *Jul. 20, 2010

(54) LOW-EMISSIVITY COATING HAVING LOW SOLAR REFLECTANCE

(75) Inventor: Wayne L. Hoffman, Spring Green, WI (US)

(73) Assignee: Cardinal CG Company, Eden Prairie, MN (US)

( * ) Notice: Subject to any disclaimer, the term of this patent is extended or adjusted under 35 U.S.C. 154(b) by 758 days.

This patent is subject to a terminal disclaimer.

(21) Appl. No.: 11/413,775

(22) Filed: Apr. 28, 2006

(65) Prior Publication Data

US 2006/0193976 A1    Aug. 31, 2006

(51) Int. Cl.
B05D 5/06    (2006.01)
(52) U.S. Cl. ...................................... 427/165
(58) Field of Classification Search ............. 427/162, 427/164, 165, 166; 428/432–434, 699, 701–702
See application file for complete search history.

(56) References Cited

U.S. PATENT DOCUMENTS

| | | | |
|---|---|---|---|
| 2,207,656 A | 7/1940 | Cartwright et al. ............... 88/1 |
| 3,516,720 A | 6/1970 | Mauer ............................ 350/2 |
| 3,537,944 A | 11/1970 | Grubb et al. .................... 161/4 |
| 3,682,528 A | 8/1972 | Apfel et al. ..................... 350/1 |
| 3,781,077 A | 12/1973 | Groth ............................. 350/1 |
| 3,978,272 A | 8/1976 | Donley ........................ 428/434 |
| 3,978,273 A | 8/1976 | Groth ........................... 428/434 |
| 3,990,784 A | 11/1976 | Gelber ......................... 350/166 |
| 4,098,956 A | 7/1978 | Blickensderfer et al. .... 428/627 |
| 4,235,048 A | 11/1980 | Gillery .......................... 49/390 |
| 4,313,647 A | 2/1982 | Takazawa .................... 350/164 |
| 4,327,967 A | 5/1982 | Groth .......................... 350/258 |
| 4,348,453 A | 9/1982 | Cohen ......................... 428/333 |
| 4,413,877 A | 11/1983 | Suzuki ......................... 350/1.7 |
| 4,440,822 A | 4/1984 | Gordon ....................... 428/216 |
| 4,462,883 A | 7/1984 | Hart ............................. 204/192 |
| 4,487,197 A | 12/1984 | Hoyois ........................ 126/901 |
| 4,497,700 A | 2/1985 | Groth et al. ................. 204/192 |
| 4,534,841 A | 8/1985 | Hartig ...................... 204/192 P |
| 4,548,691 A | 10/1985 | Dietrich ................... 204/192 P |

(Continued)

FOREIGN PATENT DOCUMENTS

AU    0048985    2/2001

(Continued)

OTHER PUBLICATIONS

English-language abstract for JP2000192227.

(Continued)

*Primary Examiner*—Timothy H Meeks
*Assistant Examiner*—Elizabeth Burkhart
(74) *Attorney, Agent, or Firm*—Fredrikson & Byron, P.A.

(57) ABSTRACT

The invention provides low solar reflectance, low-emissivity coatings. The invention also provides a pane bearing a low solar reflectance, low-emissivity coating. Further, the invention provides an insulating glass unit comprising first and second panes held in a spaced-apart configuration, wherein the panes have confronting inner surfaces oriented toward a between-pane space and opposed outer surfaces oriented away from the between-pane space, and wherein one of these inner surfaces bears a low solar reflectance, low-emissivity coating. Also provided are methods of producing coated substrates.

22 Claims, 10 Drawing Sheets

U.S. PATENT DOCUMENTS

| | | | |
|---|---|---|---|
| 4,583,815 A | 4/1986 | Taga et al. | 350/1.6 |
| 4,610,771 A | 9/1986 | Gillery | 204/192 |
| 4,639,069 A | 1/1987 | Yatabe et al. | 350/1.7 |
| 4,735,488 A | 4/1988 | Rancourt et al. | 350/166 |
| 4,786,784 A | 11/1988 | Nikodem | 219/543 |
| 4,790,922 A | 12/1988 | Huffer | 204/192.27 |
| 4,806,220 A | 2/1989 | Finley | 204/192.27 |
| 4,834,857 A | 5/1989 | Gillery | 204/192.27 |
| 4,847,157 A | 7/1989 | Goodman | 428/426 |
| 4,847,158 A | 7/1989 | Gillery | 428/433 |
| 4,883,721 A | 11/1989 | Nalepka et al. | 428/623 |
| 4,896,928 A | 1/1990 | Perilloux | 350/1.6 |
| 4,898,789 A | 2/1990 | Finley | 428/432 |
| 4,902,081 A | 2/1990 | Huffer | 350/1.7 |
| 4,902,580 A | 2/1990 | Gillery | 428/623 |
| 4,902,581 A | 2/1990 | Criss | 428/627 |
| 4,919,778 A | 4/1990 | Dietrich | 204/192.27 |
| 4,964,963 A | 10/1990 | Criss | 204/192.27 |
| 4,971,843 A | 11/1990 | Michelotti et al. | 428/34 |
| 4,985,312 A | 1/1991 | Furuya | 428/627 |
| 4,996,105 A | 2/1991 | Oyama | 428/336 |
| 4,997,013 A | 3/1991 | Peckels | 141/95 |
| 5,055,358 A | 10/1991 | Livingston et al. | 428/433 |
| 5,059,295 A | 10/1991 | Finley | 204/192.27 |
| 5,059,458 A | 10/1991 | Goodall | 428/34 |
| 5,073,451 A | 12/1991 | Iida et al. | 428/336 |
| 5,087,525 A | 2/1992 | Goodman | 428/428 |
| 5,110,662 A | 5/1992 | Depauw | 428/192 |
| 5,112,693 A | 5/1992 | Gillery | 428/432 |
| 5,173,800 A | 12/1992 | King | 359/360 |
| 5,214,530 A | 5/1993 | Coombs et al. | 359/359 |
| 5,216,542 A | 6/1993 | Szczyrbowski | 359/588 |
| 5,229,881 A | 7/1993 | Day et al. | 359/360 |
| 5,298,048 A | 3/1994 | Lingle | 65/60.2 |
| 5,302,449 A | 4/1994 | Eby et al. | 428/336 |
| 5,306,547 A | 4/1994 | Hood et al. | 428/213 |
| 5,334,718 A | 8/1994 | Thomas et al. | 546/118 |
| 5,337,191 A | 8/1994 | Austin | 359/885 |
| 5,348,805 A | 9/1994 | Zagdoun | 428/432 |
| 5,376,455 A | 12/1994 | Hartig | 428/428 |
| 5,377,045 A | 12/1994 | Wolfe et al. | 359/585 |
| 5,450,238 A | 9/1995 | Bjornard et al. | 359/580 |
| 5,514,476 A | 5/1996 | Hartig | 428/426 |
| 5,520,996 A | 5/1996 | Balian | 428/216 |
| 5,543,229 A | 8/1996 | Ohsaki | 428/432 |
| 5,552,180 A | 9/1996 | Finley | 427/165 |
| 5,557,462 A | 9/1996 | Hartig et al. | 359/585 |
| 5,563,734 A | 10/1996 | Wolfe | 359/360 |
| 5,584,902 A | 12/1996 | Hartig | 65/32.4 |
| 5,595,825 A | 1/1997 | Guiselin | 428/428 |
| 5,635,287 A | 6/1997 | Balian | 428/216 |
| 5,691,044 A | 11/1997 | Oyama et al. | 428/216 |
| 5,693,415 A | 12/1997 | Zait | 428/332 |
| 5,750,265 A | 5/1998 | Goodman | 428/432 |
| 5,770,321 A | 6/1998 | Hartig et al. | 428/622 |
| 5,776,603 A | 7/1998 | Zagdoun | 428/336 |
| 5,780,149 A | 7/1998 | McCurdy | 428/336 |
| 5,800,933 A | 9/1998 | Hartig et al. | 428/622 |
| 5,821,001 A | 10/1998 | Arbab | 428/623 |
| 5,837,361 A | 11/1998 | Glaser | 428/216 |
| 5,891,556 A | 4/1999 | Anderson et al. | 428/216 |
| 5,897,857 A | 4/1999 | Hillebrand et al. | 424/703 |
| 5,897,957 A | 4/1999 | Goodman | 428/432 |
| 5,902,505 A | 5/1999 | Finley | 219/547 |
| 5,938,898 A | 8/1999 | Ando et al. | 204/192.23 |
| 5,942,319 A | 8/1999 | Oyama et al. | 428/216 |
| 5,942,338 A | 8/1999 | Arbab | 428/623 |
| RE36,308 E | 9/1999 | Yang | 359/585 |
| 5,948,538 A | 9/1999 | Brochot | 428/432 |
| 5,952,084 A | 9/1999 | Anderson | 428/212 |
| 5,965,246 A | 10/1999 | Guiselin | 428/212 |
| 6,007,901 A | 12/1999 | Maschwitz | 428/216 |
| 6,014,872 A | 1/2000 | Hartig et al. | 65/58 |
| 6,020,077 A | 2/2000 | Schicht | 428/622 |
| 6,030,671 A | 2/2000 | Yang | 428/34 |
| 6,034,813 A | 3/2000 | Woodard et al. | 359/360 |
| 6,042,934 A | 3/2000 | Guiselin | 428/213 |
| 6,045,896 A | 4/2000 | Boire et al. | 428/216 |
| 6,048,621 A | 4/2000 | Gallego et al. | 428/432 |
| 6,059,909 A | 5/2000 | Hartig et al. | 156/109 |
| 6,060,178 A | 5/2000 | Krisko | 428/627 |
| 6,074,730 A | 6/2000 | Laird | 428/212 |
| 6,124,026 A | 9/2000 | McCurdy | 428/216 |
| 6,132,881 A | 10/2000 | Hartig et al. | 428/432 |
| 6,150,028 A | 11/2000 | Mazon | 428/426 |
| 6,154,598 A | 11/2000 | Gavrilovic | 385/141 |
| 6,159,607 A | 12/2000 | Hartig et al. | 428/426 |
| 6,159,621 A | 12/2000 | Schicht | 428/633 |
| 6,165,598 A | 12/2000 | Nelson | 428/212 |
| 6,174,599 B1 | 1/2001 | Boire | 428/336 |
| 6,188,512 B1 | 2/2001 | Woodard et al. | 359/359 |
| 6,190,776 B1 | 2/2001 | Demiryont | 428/434 |
| 6,210,784 B1 | 4/2001 | Rondeau | 428/212 |
| 6,218,018 B1 | 4/2001 | McKown et al. | 428/432 |
| 6,231,992 B1 | 5/2001 | Niebauer et al. | 428/472 |
| 6,231,999 B1 | 5/2001 | Krisko | 428/627 |
| 6,246,523 B1 | 6/2001 | Bradley, Jr. et al. | 359/585 |
| 6,262,830 B1 | 7/2001 | Scalora | 359/248 |
| 6,266,193 B1 | 7/2001 | Saif | 359/582 |
| 6,274,244 B1 | 8/2001 | Finley | 428/433 |
| 6,284,385 B1 | 9/2001 | Guillaumon | 428/450 |
| 6,287,675 B1 | 9/2001 | Guiselin | 428/213 |
| 6,306,525 B1 | 10/2001 | Schicht et al. | 428/633 |
| 6,322,881 B1 | 11/2001 | Boire | 428/216 |
| 6,335,142 B1 | 1/2002 | Quesnel et al. | 430/275.1 |
| 6,337,124 B1 | 1/2002 | Anderson et al. | 428/216 |
| 6,344,288 B1 | 2/2002 | Oyama et al. | 428/701 |
| 6,355,334 B1 | 3/2002 | Rondeau | 428/212 |
| 6,650,478 B1 | 11/2003 | DeBusk | 359/585 |
| 6,838,159 B2 | 1/2005 | Eby | 428/216 |
| 2001/0003628 A1 | 6/2001 | Demiryont | 428/630 |
| 2001/0006734 A1 | 7/2001 | Demiryont | 428/432 |
| 2001/0021540 A1 | 9/2001 | Woodward et al. | 438/98 |
| 2001/0044032 A1 | 12/2001 | Guiselin | 428/213 |
| 2001/0053439 A1 | 12/2001 | Guiselin | 428/213 |
| 2002/0009601 A1 | 1/2002 | Stachowiak | 428/432 |
| 2002/0016250 A1 | 2/2002 | Hayakawa | 502/5 |
| 2002/0034641 A1 | 3/2002 | Ebisawa | 428/426 |
| 2002/0037414 A1 | 3/2002 | Cunningham | 428/412 |
| 2002/0037421 A1 | 3/2002 | Arnaud | 428/472 |
| 2002/0045037 A1 | 4/2002 | Boire | 428/216 |
| 2002/0136905 A1 | 9/2002 | Medwick | 428/432 |
| 2003/0049464 A1 | 3/2003 | Glenn | 428/432 |
| 2003/0148115 A1 | 8/2003 | Glenn | 428/432 |
| 2003/0165693 A1 | 9/2003 | Hartig | 428/426 |
| 2003/0165694 A1 | 9/2003 | Hartig | 428/428 |
| 2003/0186064 A1 | 10/2003 | Murata | 428/432 |
| 2004/0009356 A1 | 1/2004 | Medwick | 428/432 |
| 2004/0016202 A1 | 1/2004 | Hoffman | 52/786 |
| 2004/0071985 A1 | 4/2004 | Krisko | 428/434 |
| 2004/0241457 A1 | 12/2004 | Macquart | 428/432 |
| 2004/0247929 A1 | 12/2004 | Buhay | 428/621 |
| 2005/0123772 A1 | 6/2005 | Coustet | 428/432 |

FOREIGN PATENT DOCUMENTS

| | | |
|---|---|---|
| EP | 0341002 | 11/1989 |
| EP | 0847965 | 12/1997 |
| EP | 1044934 | 10/2000 |
| EP | 1329307 | 7/2003 |
| JP | 7232934 | 9/1995 |
| JP | 2000192227 | 7/2000 |
| JP | 2000302486 | 10/2000 |
| WO | WO 97/48649 | 12/1997 |

| | | |
|---|---|---|
| WO | WO 99/58736 | 11/1999 |
| WO | WO 02/18132 | 3/2002 |
| WO | WO 02/26488 | 4/2002 |
| WO | WO 02/48065 | 6/2002 |
| WO | WO 03/074441 | 9/2003 |
| WO | WO 03/074442 | 9/2003 |

OTHER PUBLICATIONS

English-language abstract for JP2000302486.
English-language abstract for JP7232934.

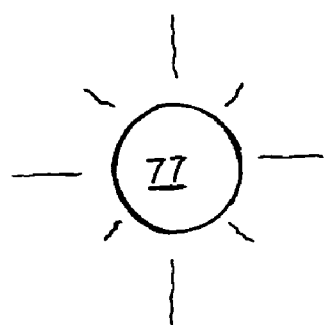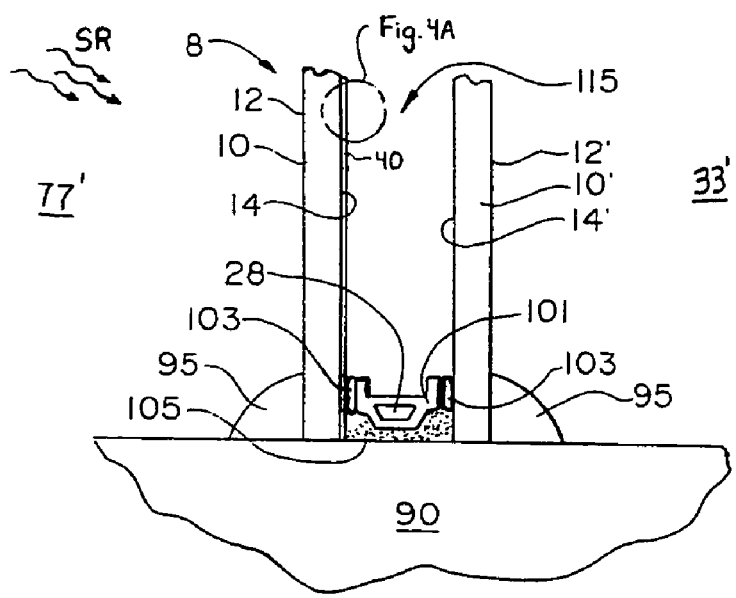
Figure 4

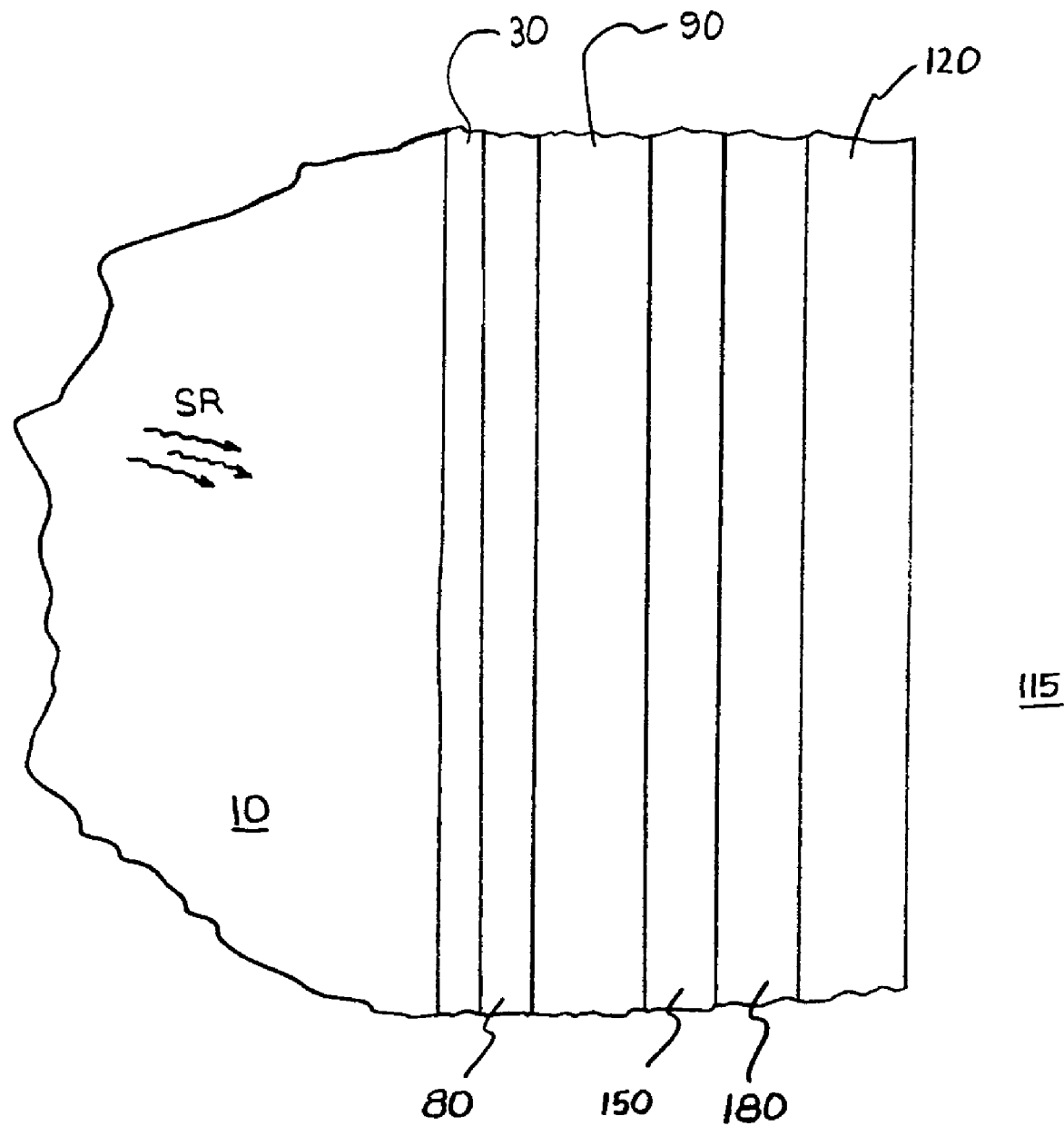

LOW-EMISSIVITY COATING HAVING LOW SOLAR REFLECTANCE

CROSS-REFERENCE TO RELATED APPLICATIONS

This application claims priority to U.S. patent application Ser. No. 10/423,837, filed on Apr. 25, 2003, which in turn claims priority to U.S. Patent Application No. 60/411,031 filed on Sep. 16, 2002, and U.S. Patent Application No. 60/376,826 filed on Apr. 29, 2002, the entire disclosure of each of which is hereby incorporated by reference.

FIELD OF THE INVENTION

The present invention provides coatings for glass and other substrates. More particularly, this invention provides low-emissivity coatings that have low solar reflectance. The invention also provides methods for producing coatings of this nature, as well as insulating glass units and monolithic panes carrying these coatings.

BACKGROUND OF THE INVENTION

Windows can reflect a surprising amount of solar radiation. In some cases, this reflected radiation can become problematic. A certain amount of energy is, of course, carried in the solar radiation reflected off the exterior of a window. When this radiation falls on a nearby surface, the surface can be discolored. While this can occur even with a window having clear uncoated glass, the problem can be more significant when the window bears a coating that is highly reflective of solar radiation. This problem can also be more significant if the panes of the window in question have become inwardly cupped. (The panes of an IG unit can become cupped, for example, during cold weather when gas in the interior of the unit contracts.) The concave exterior pane of such a window would concentrate its reflected radiation at a focal point exterior to the window. This focal point would tend to move as the sun moves across the sky, thus potentially leaving elongated paths of discoloration.

As noted above, solar reflection problems can be particularly significant for windows and other glazings (e.g., doors, skylights, etc.) that bear reflective coatings, such as low-emissivity coatings. Low-emissivity coatings are well known in the present art. These coatings commonly include one or more reflective silver layers and two or more transparent dielectric layers. The silver layers in these coatings are highly reflective of infrared radiation. Thus, they favorably reduce the transmission of radiant heat through the coating. However, these coatings also tend to have relatively high solar reflectance. For example, a window bearing a conventional low-emissivity coating would typically have a solar reflectance of at least about 30%-35%, while the solar reflectance of a window having clear uncoated glass would typically be around 13%. Thus, from the perspective of solar reflection problems, conventional low-emissivity coatings are less than ideal. It would be desirable to provide a low-emissivity coating that has low solar reflectance.

It would be particularly desirable to provide a low-emissivity coating that has low solar reflectance and also provides significant shading properties. As is well known, the solar heat gain coefficient (SHGC) of a window is the fraction of incident solar radiation that is admitted through a window. There are a number of applications where low solar heat gain windows are of particular benefit. In warm climates, it is especially desirable to have low solar heat gain windows. For example, solar heat gain coefficients of about 0.4 and below are generally recommended for buildings in the southern United States. Similarly, any windows that are exposed to a lot of undesirable sun preferably have a low solar heat gain coefficient. For example, windows on the east or west side of a building tend to get a lot of sun in the morning and afternoon. Of course, sunrooms, solariums, and greenhouses also get a great deal of sun. For applications like these, the solar heat gain coefficient of a window plays an important role in maintaining a comfortable environment within the building. Thus, it is beneficial to provide windows of this nature with coatings that establish a low solar heat gain coefficient (i.e., high shading ability coatings).

A tradeoff is sometimes made in high shading ability coatings whereby the films selected to achieve a low SHGC have the effect of restricting the visible reflectance to a higher level than is ideal. As a consequence, windows bearing these coatings may have a somewhat mirror-like appearance. It would be desirable to provide a high shading ability coating that has sufficiently low visible reflectance to obviate this mirror-like appearance problem.

In addition to having undesirably high visible reflectance, the transmitted and reflected colors of conventional high shading ability coatings tend not to be ideal. For example, these coatings commonly exhibit hues that are more red and/or yellow than is desired. To the extent a coating has a colored appearance, it is pleasing if the coating exhibits a transmitted and/or reflected hue that is blue or blue-green. The chroma of these coatings tends also to be greater than is desired. In most cases, it is preferable to provide a coating that is as color neutral (i.e., colorless) as possible. Thus, the reflected and transmitted colors of conventional low solar heat gain coatings tend to be less than ideal, both in terms of hue and chroma.

It would be desirable to provide low-emissivity coatings that have low solar reflectance. It would be particularly desirable to provide low solar reflectance, low-emissivity coatings that exhibit pleasing color in transmission and/or reflection. Further, it would be particularly desirable to provide low solar reflectance, low-emissivity coatings that have a low solar heat gain coefficient, especially such coatings as also exhibit pleasing color in transmission and/or reflection. It would be especially desirable to provide low solar reflectance, low-emissivity coatings that have a low solar heat gain coefficient and also have low visible reflectance. It would be exceptionally desirable to provide low solar reflectance, low-emissivity coatings that have a low solar heat gain coefficient, low visible reflectance, and pleasing color in reflection and/or transmission.

SUMMARY OF THE INVENTION

In certain embodiments, the invention provides a pane bearing a low-emissivity coating. In these embodiments, the low-emissivity coating comprises an infrared-reflective layer, a high absorption primary layer, and a middle coat. This infrared-reflective layer comprises material that is highly reflective of infrared radiation. The high absorption primary layer comprises material that is highly absorptive of solar radiation. The high absorption primary layer includes at least about 100 angstroms of film (e.g., has a thickness of at least about 100 angstroms). The middle coat comprises at least one transparent dielectric film and is positioned between the high absorption primary layer and the infrared-reflective layer.

In certain embodiments, the invention provides a pane bearing a low-emissivity coating. In the present embodiments, the coating comprising the following sequence of films (which are not necessarily contiguous to one another): an inner coat comprising at least one transparent dielectric film; a high absorption primary layer comprising material that is highly absorptive of solar radiation, the high absorption primary layer including at least about 100 angstroms of film (e.g., having a thickness of at least about 100 angstroms); a middle coat comprising at least one transparent dielectric film; an infrared-reflective layer comprising material that is highly reflective of infrared radiation; a high absorption blocker layer comprising material that is highly absorptive of solar radiation, the high absorption blocker layer including at least about 75 angstroms of film (e.g., having a thickness of at least about 75 angstroms); and an outer coat comprising at least one transparent dielectric film.

In certain embodiments, the invention provides a method of producing coated substrates. The method comprises providing a pane having generally-opposed first and second major surfaces. A low-emissivity coating is deposited upon one of the major surfaces of the pane. This low-emissivity coating comprises an infrared-reflective layer, a high absorption primary layer, and a middle coat. The infrared-reflective layer comprises material that is highly reflective of infrared radiation. The high absorption primary layer comprises material that is highly absorptive of solar radiation. The high absorption primary layer includes at least about 100 angstroms of film (e.g., has a thickness of at least about 100 angstroms). The middle coat comprises at least one transparent dielectric film and is positioned between the high absorption primary layer and the infrared-reflective layer. In some cases, the method comprises depositing the infrared-reflective layer as a silver-containing film. The method optionally comprises depositing the infrared-reflective layer at a thickness of at least about 50 angstroms. In some cases, the method comprises depositing the high absorption primary layer as a titanium-containing film. For example, the high absorption primary layer can optionally be deposited as metallic titanium. In some cases, the infrared-reflective layer is deposited further from the pane than the high absorption primary layer. If so desired, the method can comprise depositing a high absorption blocker layer over the infrared-reflective layer, the high absorption blocker layer comprising material that is highly absorptive of solar radiation and including at least about 75 angstroms of film. For example, a high absorption blocker layer can be deposited directly over the infrared-reflective layer, if so desired. In some cases, the optional high absorption blocker layer is deposited as a titanium-containing film. For example, the optional high absorption blocker layer can be deposited as metallic titanium. In some cases, the deposition of the middle coat comprises depositing a zinc oxide film directly upon the high absorption primary layer. Further, in some cases, the deposition of the middle coat comprises depositing a first intermediate zinc oxide film, an intermediate titanium dioxide film, and a second intermediate zinc oxide film. For example, such first intermediate zinc oxide film can be deposited at a thickness of between about 238 angstroms and about 422 angstroms, such intermediate titanium dioxide film can be deposited at a thickness of between about 65 angstroms and about 103 angstroms, and such second intermediate zinc oxide films can be deposited at a thickness of between about 80 angstroms and about 172 angstroms. In some cases, the method comprises depositing an inner coat between the substrate and the high absorption primary layer and depositing an outer coat further from the substrate than the infrared-reflective layer, wherein the inner and outer coats each comprise at least one transparent dielectric film.

BRIEF DESCRIPTION OF THE DRAWINGS

FIG. 4 is a schematic cross-sectional view of a glazing carrying a low solar reflectance coating in accordance with certain embodiments of the invention;

FIG. 4A is a detailed cross-sectional view of region 4A of the low solar reflectance coating carried by the glazing of FIG. 4;

DETAILED DESCRIPTION OF PREFERRED EMBODIMENTS

Figure 1:
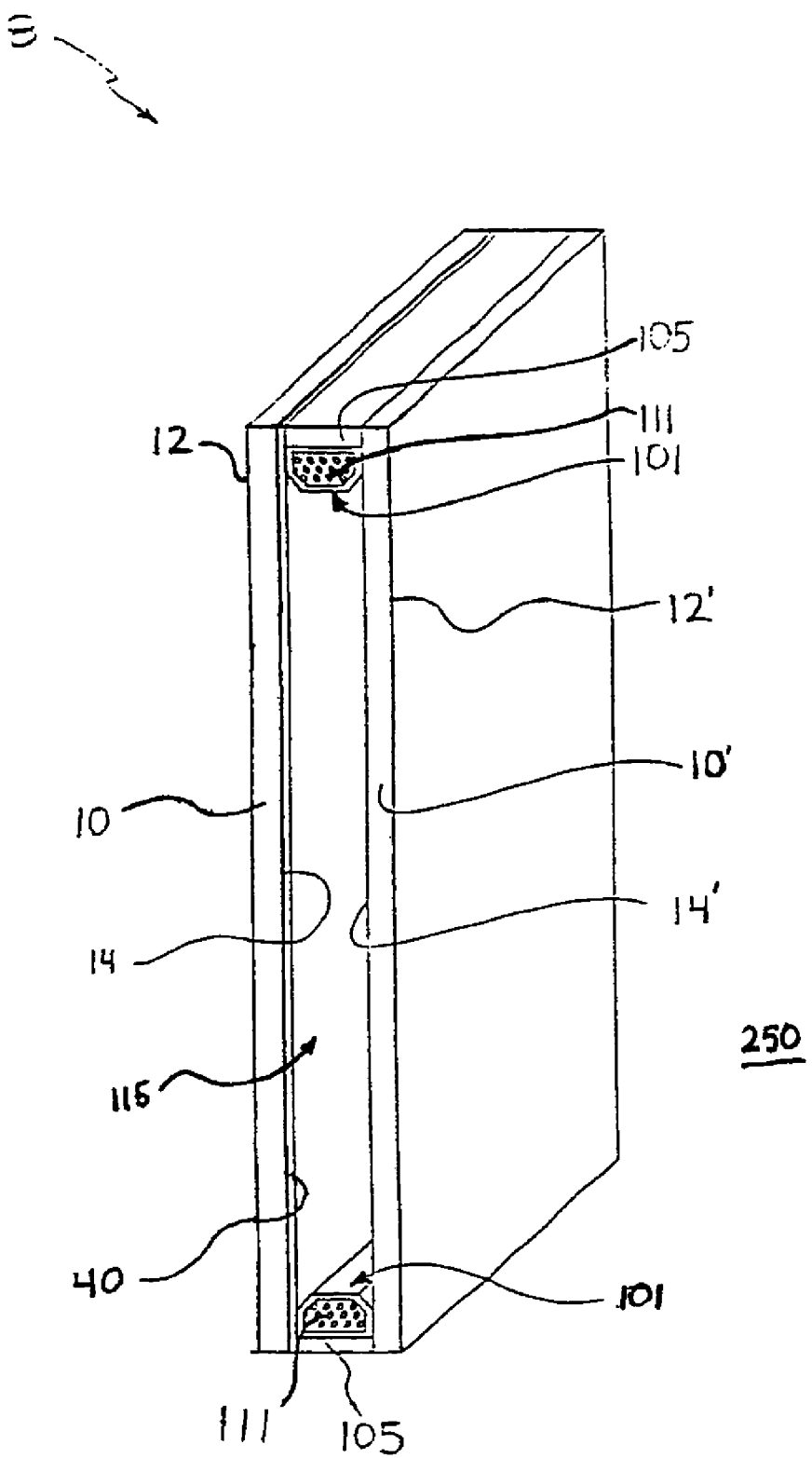
FIG. 1 is a cross-sectional perspective view of an insulating glass unit in accordance with certain embodiments of the present invention.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

A variety of substrates are suitable for use in the present invention. In most cases, the substrate 10 is a sheet of transparent material (i.e., a transparent sheet). However, the substrate 10 is not required to be transparent. For example, opaque substrates may be useful in some cases. However, it is anticipated that for most applications, the substrate will comprise a transparent or translucent material, such as glass or clear plastic. In many cases, the substrate 10 will be a glass pane. A variety of known glass types can be used, and soda lime glass is expected to be preferred.

Tinted glass can optionally be used in certain embodiments of the invention. Many suitable types of tinted glass are available from well known glass suppliers. Thus, a low solar reflectance coating of the invention can be applied to a pane of tinted glass, if so desired. In some cases, there is provided a multiple pane insulating glass unit (or "IG unit") wherein the low solar reflectance coating is applied to a pane of tinted glass, and this coated pane is incorporated (e.g., as an outboard pane) into an IG unit that also includes at least one pane (e.g., an inboard pane) of clear glass. While embodiments of this nature are contemplated, the present low solar reflectance coating 40 is particularly advantageous when used simply with clear glass.

In certain embodiments, the invention provides an IG unit that is provided with at least one low solar reflectance coating. IG units are well known in the present art. FIG. 1 depicts one example of an IG unit 8 that can be provided in accordance with the invention. The invention, however, is not limited to practice with any particular type of IG unit. To the contrary, all aspects of invention can be practiced with IG units of any type (e.g., all-glass units, vacuum units, etc.). Thus, the illustrated IG unit type is not to be construed as limiting to the invention. Further, while the term insulating "glass" unit is used throughout the present disclosure, it is to be understood that the panes need not be formed of glass.

The IG unit 8 shown in FIG. 1 includes a first pane 10 and a second pane 10', together forming a pair of spaced-apart panes. The panes 10, 10' bound a between-pane space 115 therebetween and an exterior space 250 thereabout. The panes have confronting inner surfaces 14, 14' oriented toward the between-pane space 115 and opposed outer surfaces 12, 12' oriented away from the between-pane space 115. In the embodiment of FIG. 1, the panes 10, 10' are held in a spaced-apart configuration (e.g., in a substantially parallel spaced-apart relationship) by a spacer 101. The spacer 101 joins the peripheral inner surfaces of the panes. Thus, the spacer 101 and the confronting inner surfaces 14, 14' of the panes 10, 10' together define the between-pane space 115. Useful IG units, components thereof, and methods of manufacturing and using IG units are detailed in U.S. patent application Ser. No. 10/076,211, the entire teachings of which are incorporated herein by reference.

In the embodiment of FIG. 1, the illustrated IG unit 8 bears only one coating 40. However, other coatings can be provided on one or more of the other major surfaces 12, 12', 14' of the IG unit 8, if so desired. For example, it may be desirable to provide any of a variety of different coatings on one or both outer surfaces 12, 12' of the IG unit. In certain embodiments, a hydrophilic coating (not shown) is provided on one or both outer surfaces 12, 12'. In one embodiment, the #1 surface (defined below) of an IG unit bears a hydrophilic coating, while the #2 surface (also defined below) bears the low solar reflectance coating 40. Useful hydrophilic coatings are disclosed in U.S. patent application Ser. Nos. 09/868,542, 09/572,766, and 09/599,301, the entire teachings of each of which are incorporated herein by reference. In another embodiment, the #1 surface bears a hydrophobic coating, while the #2 surface bears the low solar reflectance coating 40. Useful hydrophobic coatings are disclosed in U.S. Pat. No. 5,424,130 (Nakanishi et al), the entire teachings of which are incorporated herein by reference.

Further, certain embodiments provide an IG unit 8 wherein a photocatalytic coating (not shown) is provided on one or both outer surfaces 12, 12' of the IG unit 8. In one embodiment, the #1 surface of an IG unit bears a photocatalytic coating, and the #2 surface bears the low solar reflectance coating 40. Useful photocatalytic coatings are described in U.S. Pat. No. 5,874,701 (Watanabe et al), U.S. Pat. No. 5,853, 866 (Watanabe et al), U.S. Pat. No. 5,961,843 (Hayakawa et al.), U.S. Pat. No. 6,139,803 (Watanabe et al), U.S. Pat. No. 6,191,062 (Hayakawa et al.), U.S. Pat. No. 5,939,194 (Hashimoto et al.), U.S. Pat. No. 6,013,372 (Hayakawa et al.), U.S. Pat. No. 6,090,489 (Watanabe et al.), U.S. Pat. No. 6,210,779 (Watanabe et al.), U.S. Pat. No. 6,165,256 (Hayakawa et al.), and U.S. Pat. No. 5,616,532 (Heller et al.), the entire teachings of each of which are incorporated herein by reference.

Figure 5:
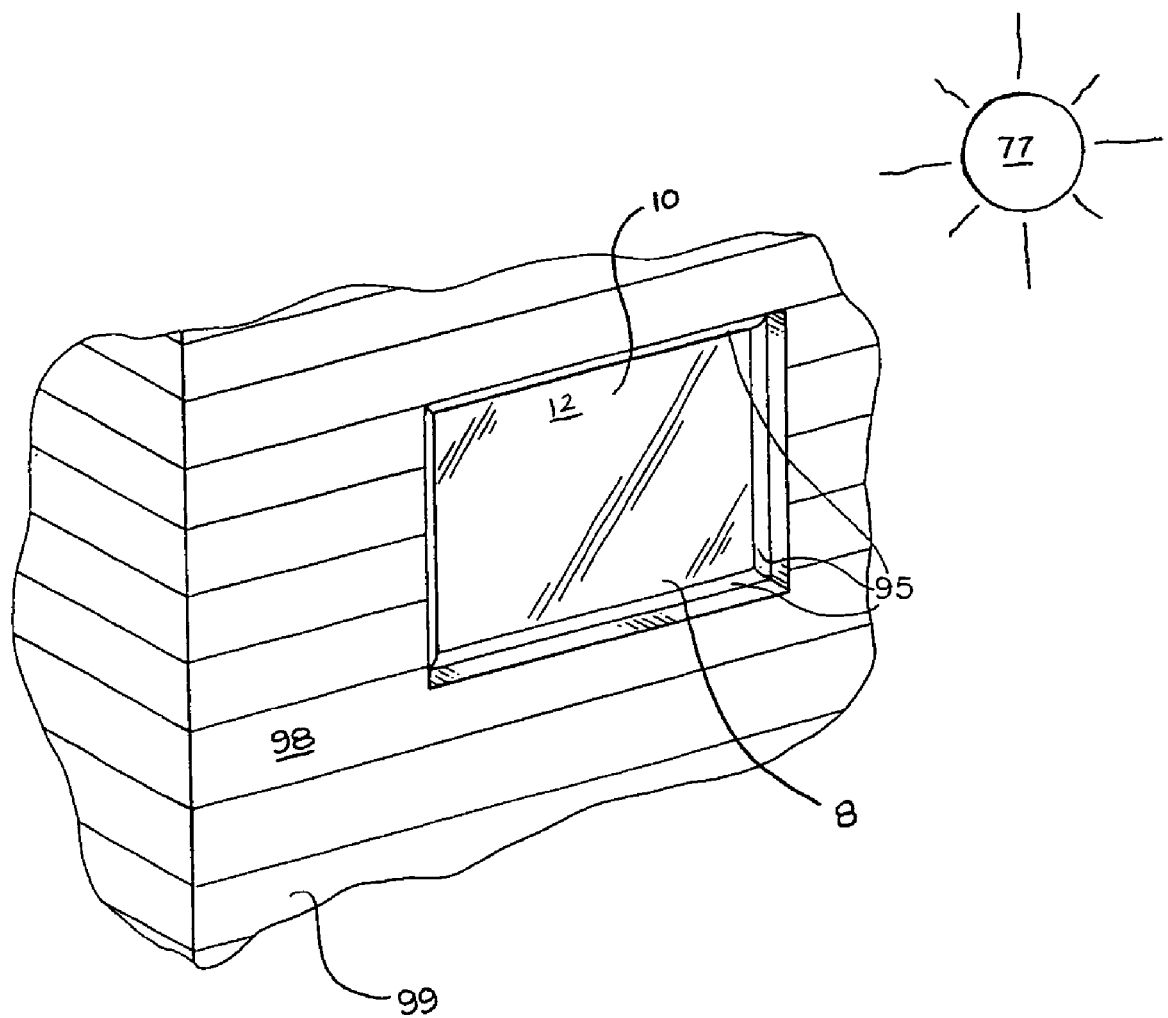
FIG. 5 is a perspective view of a glazing that carries a low solar reflectance coating and has been mounted in the outer wall of a building in accordance with certain embodiments the invention.

The present low solar reflectance, low-emissivity coating 40 is preferably carried on the "second" surface of an IG unit. This is perhaps best appreciated with reference to FIGS. 4 and 5, wherein there is illustrated an IG unit 8 mounted upon a frame 90 in an exterior wall 98 of a building 99. In such embodiments, the "first" (or "#1") surface is that which faces (i.e., is exposed to, and communicates with) the outdoor environment. Accordingly, it is the #1 surface that radiation SR from the sun 77 first strikes. In FIGS. 4 and 5, the outer surface 12 of the first pane 10 is the so-called first surface. Moving from the #1 surface toward the interior side 33', the next surface is the "second" (or "#2") surface. As seen in FIG. 4, the inner surface 14 of the first pane 10 is the so-called second surface. Moving further toward the interior side 33', the next surface is the "third" (or "#3") surface, followed by the "fourth" (or "#4") surface. In FIG. 4, the inner surface 14' of the second pane 10' is the so-called third surface, and the outer surface 12' of this pane 10' is the so-called fourth surface.

Thus, certain preferred embodiments of the invention provide an IG unit 8 wherein an inner surface 14 bears the low solar reflectance, low-emissivity coating 40. This coating 40 includes an infrared-reflective layer 150 and a high absorption primary layer 80. The high absorption primary layer 80 comprises titanium or another material that is highly absorptive of solar radiation. The high absorption primary layer 80 preferably has a thickness of at least about 100 angstroms. The high absorption primary layer 80 is preferably positioned further to the exterior 77' than the infrared-reflective layer 150, as is perhaps best appreciated with reference to FIGS. 4 and 4A.

In embodiments where the low solar reflectance coating 40 is carried on the #2 surface of the IG unit 8, the high absorption primary layer 80 is positioned closer to the first pane 10 than the infrared-reflective layer 150. In certain embodiments of this nature, the low solar reflectance coating 40 comprises, in sequence from the substrate 10: an inner coat 30 comprising at least one transparent dielectric film; a high absorption primary layer 80 (e.g., comprising titanium or another highly absorptive material, preferably having a thickness of at least about 100 angstroms); a middle coat 90 comprising at least one transparent dielectric film; an infrared-reflective layer 150 (e.g., formed of silver or another electrically conductive material); a high absorption blocker layer 180 (e.g., comprising titanium or another highly absorptive material, and preferably having a thickness of at least about 75 angstroms); and an outer coat 120 comprising at least one transparent dielectric film.

The present low solar reflectance, low-emissivity coating 40 has a number of beneficial properties. The ensuing discussion reports several of these properties. In some cases, these properties are reported in the context of a single pane 10 bearing the present coating 40 on one surface 14. In other cases, these properties are reported in the context of an IG unit having the present coating 40 on its #2 surface. In such cases, the reported properties were determined for an IG unit wherein both panes are 3 mm soda lime float glass, and wherein the IG unit has a ½ inch between-pane space filled with an insulative gas mix of 90% argon and 10% air. Of course, these specifics are by no means limiting to the invention. Absent an express statement to the contrary, the present discussion reports determinations made using Window 4.1 under standard ASHRAE conditions.

An IG unit bearing a conventional double silver low-emissivity coating would typically have an exterior (i.e., off the glass side of the outboard pane) solar reflectance $R_s$ of at least about 30%-35%. Given the solar reflection problems discussed above, it would be desirable to provide a low-emissivity coating that offers lower solar reflection. The present IG unit 8 achieves an exterior solar reflectance $R_s$ of less than about 30%. In fact, the present IG unit 8 achieves an exterior solar reflectance $R_s$ of less than about 20%. While the precise level of solar reflection can be selected and varied in accordance with the teachings of this disclosure, certain preferred embodiments (e.g., where the coating 40 is one of the five uniquely preferred film stacks detailed below) provide an IG unit 8 having an exterior solar reflectance $R_s$ of about 15%. In comparison, the exterior solar reflectance of an IG unit having panes of clear uncoated glass would typically be of about 13%.

The term "solar reflectance" is well known in the present art. This term is used herein in accordance with its well known meaning to refer to the percentage of all incident solar radiation SR that is reflected off the glass side of a monolithic pane (which bears the coating 40 on the opposite film side) or off the exterior of the present IG unit. Skilled artisans will appreciate that the solar reflectance measured off the glass side of the monolithic page includes not only solar radiation reflected at the surface 12, but also solar radiation reflected at the surface 14. Likewise, the solar reflectance of the exterior side of the IG unit 8 (measured from the exterior 77 of the unit 8) includes not only solar radiation reflected at the surface 12, but also solar radiation reflected at surfaces 14, 14', and 12'. The reported solar reflectance is measured off a central portion of the glass side of the monolithic pane or off a central portion of the glass side of the outboard pane 10 of the present IG unit 8, and is indicated as $R_s$ where s stands for solar. The solar reflectance can be determined as specified in "Standard Test Methods for Solar Energy Transmittance and Reflectance (Terrestrial) of Sheet Materials, ASTM", the entire teachings of which are incorporated herein by reference.

Figure 6:
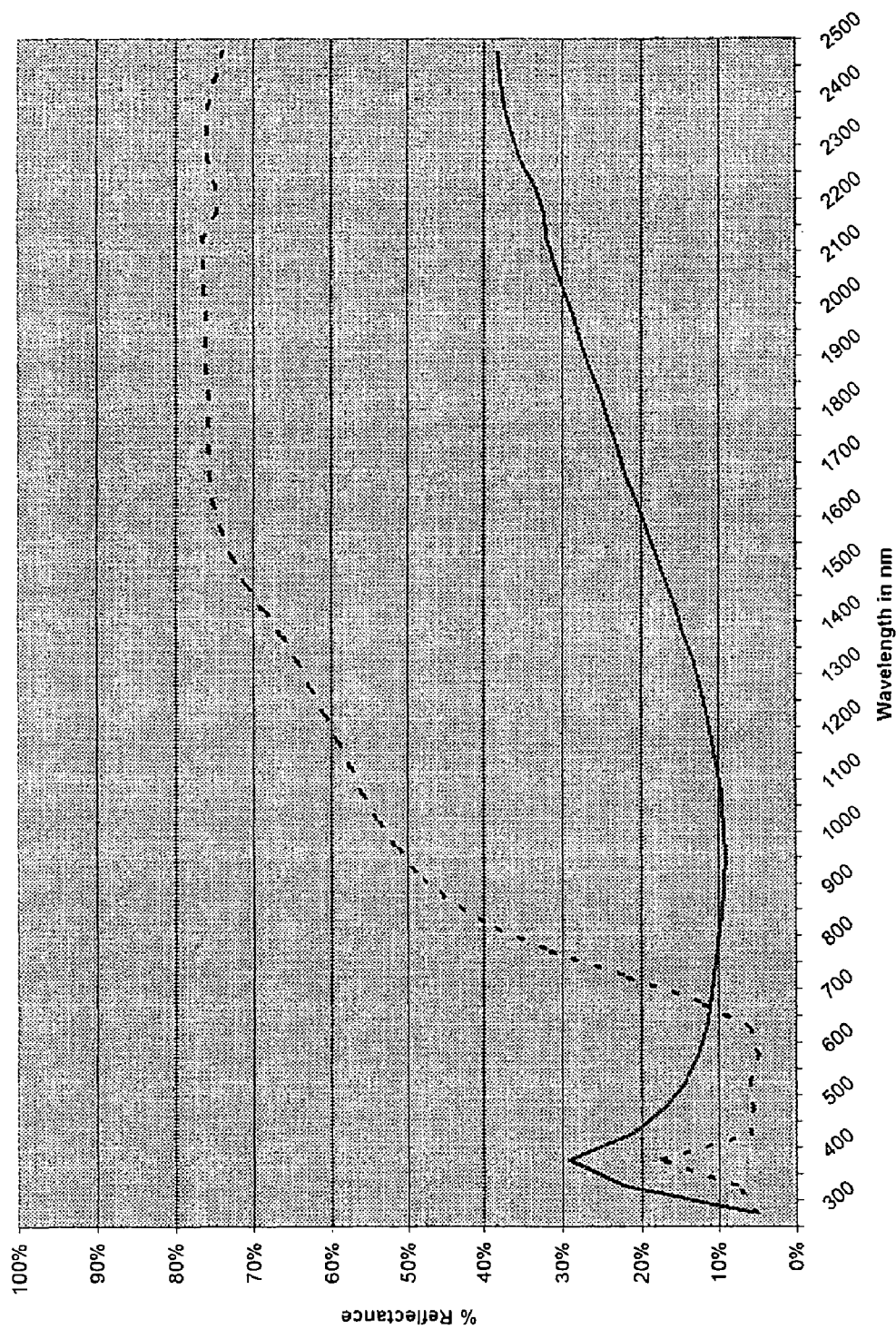
FIG. 6 is a graph of the glass-side solar reflectance of a monolithic glass pane carrying a low solar reflectance coating in accordance with certain embodiments of the invention.

FIG. 6 is a graph showing the glass-side reflectance of a monolithic pane bearing the present coating (denoted by the solid line) relative to the glass-side reflectance of a monolithic pane bearing a double silver low-emissivity coating (denoted by the dashed line). The reflectance is reported in FIG. 6 for wavelengths between about 300 nm and about 2,500 nm. This wavelength range is of interest because the solar radiation that reaches the earth is primarily in this range. From this figure, it can be appreciated that the solar reflection of the present coating 40 is far less than that of the double-silver coating. It is estimated that about 90% of terrestrial solar radiation is at wavelengths between about 400 nm and about 1,500 nm. In this more narrow wavelength range, it can also be appreciated that the present coating is far less reflective than the double-silver coating. Thus, the present coating 40 offers exceptionally low solar reflection.

In addition to low solar reflectance, the present coating 40 has exceptional shading ability. For example, the solar heat gain coefficient (SHGC) of the present IG unit 8 is particularly low. As is well known in the art, the solar heat gain coefficient of a window is the fraction of incident solar radiation that is admitted through the window. The term "solar heat gain coefficient" is used herein in accordance with its well known meaning. Reference is made to NFRC 200-93 (1993), the entire teachings of which are incorporated herein by reference.

As noted above, there are many applications where low solar heat gain windows are of particular benefit. In warm climates, for example, it is desirable to have low solar heat gain windows. Further, any windows that are exposed to a lot of undesirable sun should have a low solar heat gain coefficient. Windows on the east or west side of a building tend to get a lot of sun in the morning and afternoon. In cases like these, the solar heat gain coefficient of a window plays a vital role in maintaining a comfortable environment within the building. Thus, it is beneficial to provide windows of this nature with coatings that establish a low solar heat gain coefficient. For example, a solar heat gain coefficient of about 0.4 or less is commonly recommended for buildings in the southern United States and other warm climates.

The exceptional shading ability of the present low solar reflectance coating 40 is particularly beneficial for warm climate applications. For example, the present IG unit 8 has a solar heat gain coefficient of less than about 0.4. In fact, the present IG unit 8 has a solar heat gain coefficient of less than about 0.3, and preferably less than about 0.2. While the precise level of shading ability can be selected and varied in accordance with the teachings of this disclosure, certain preferred embodiments (e.g., where the coating 40 is one of the five uniquely preferred film stacks detailed below) provide an IG unit 8 having a solar heat gain coefficient of about 0.15. Thus, the present low solar reflectance coating 40 is particularly beneficial when high shading ability is desired.

A limitation of some high shading ability coatings is that they reflect more visible light than is desired. As noted above, a tradeoff is sometimes made in high shading ability coatings whereby the films selected to achieve a low SHGC have the effect of restricting the visible reflectance to a level that is higher than ideal. As a consequence, windows bearing these coatings may have a somewhat mirror-like appearance.

To the contrary, the present coating 40 has sufficiently low visible reflectance to obviate this mirror-like appearance problem. For example, the total visible reflection $R_v$ off the exterior of the present IG unit 8 is less than about 20%. In fact, the present IG unit 8 achieves a total exterior visible reflectance $R_v$ of less than about 18%. While the precise level of visible reflectance can be selected and varied in accordance with the present teachings certain preferred embodiments (e.g., where the coating 40 is one of the five uniquely preferred film stacks detailed below) achieve an IG unit 8 having a total exterior visible reflectance $R_v$ of about 14%. In comparison, the total visible reflectance off the exterior of an IG unit having panes of clear uncoated glass would typically be about 15%.

The term "visible reflectance" is well known in the present art. This term is used herein in accordance with its well known meaning to refer to the percentage of all incident visible radiation that is reflected off the glass side of a monolithic pane (which bears the coating 40 on the opposite film side) or off the exterior of the present IG unit. Skilled artisans will appreciate that the visible reflectance off the glass side of a monolithic pane includes not only visible radiation reflected at the surface 12, but also visible radiation reflected at the surface 14. Likewise, the visible reflectance off the exterior side of the IG unit 8 (measure from the exterior 77 of the unit 8) includes not only visible radiation reflected at the surface 12, but also visible radiation reflected at surfaces 14, 14', and 12'. The reported visible reflectance is measured off a central portion of the glass side of the monolithic pane or off a central portion of the glass side of the outboard pane 10 of the present IG unit 8, and is indicated as $R_v$, where v stands for visible and g stands for glass side. Visible reflectance can be determined as specified in the above-noted "Standard Test Methods for Solar Energy Transmittance and Reflectance (Terrestrial) of Sheet Materials, ASTM". Visible radiation comprises the wavelength range of between about 380 nm and about 780 nm. In this range of wavelengths, the glass-side reflectance of a monolithic pane bearing the present coating 40 is between about 10% and about 30%, as shown in FIG. 6.

Figure 9:
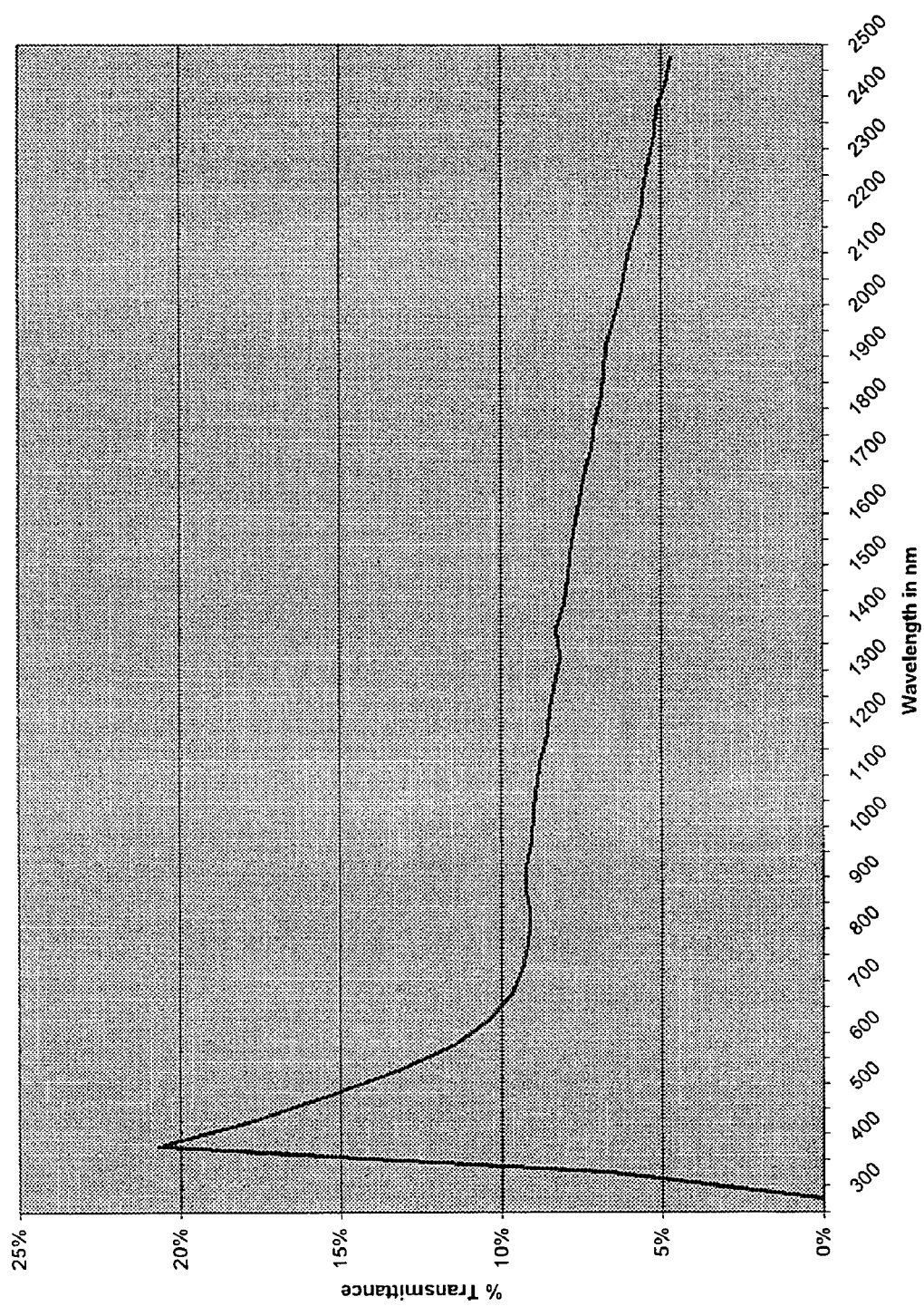
FIG. 9 is a graph of the solar transmittance of a monolithic glass pane carrying a low solar reflectance coating in accordance with certain embodiments of the invention.

FIG. 9 shows transmission properties of a monolithic pane bearing the present low solar reflectance coating 40 on one surface. As can be appreciated, the transmittance of the pane is highest across the visible range of wavelengths. The peak transmittance, which occurs at a wavelength of about 380 nm, is about 21%. Further, the transmittance decreases at wavelengths outside the range of visible light. As will be appreciated by skilled artisans, these transmission properties are quite desirable.

In addition to these beneficial properties, the present coating 40 achieves color properties that are particularly pleasing. The following discussion of transmitted and reflected color is reported using the well known color coordinates of "a" and "b". In particular, these color coordinates are indicated herein using the subscript h (i.e., $a_h$ and $b_h$) to represent the conventional use of the well known Hunter Lab Color System (Hunter methods/units, Ill. D65, 10 degree observer). The present color properties can be determined as specified in ASTM D-2244-93, "Standard Test Method For Calculation Of Color Differences From Instrumentally Measured Color Coordinates", Sep. 15, 1993, as augmented by ASTM E-308-85 Annual Book of ASTM Standards, Vol. 06.01 "Standard Method For Computing The Colors Of Objects By Using The CIE System", the entire teachings of each of which are incorporated herein by reference.

Figure 7:
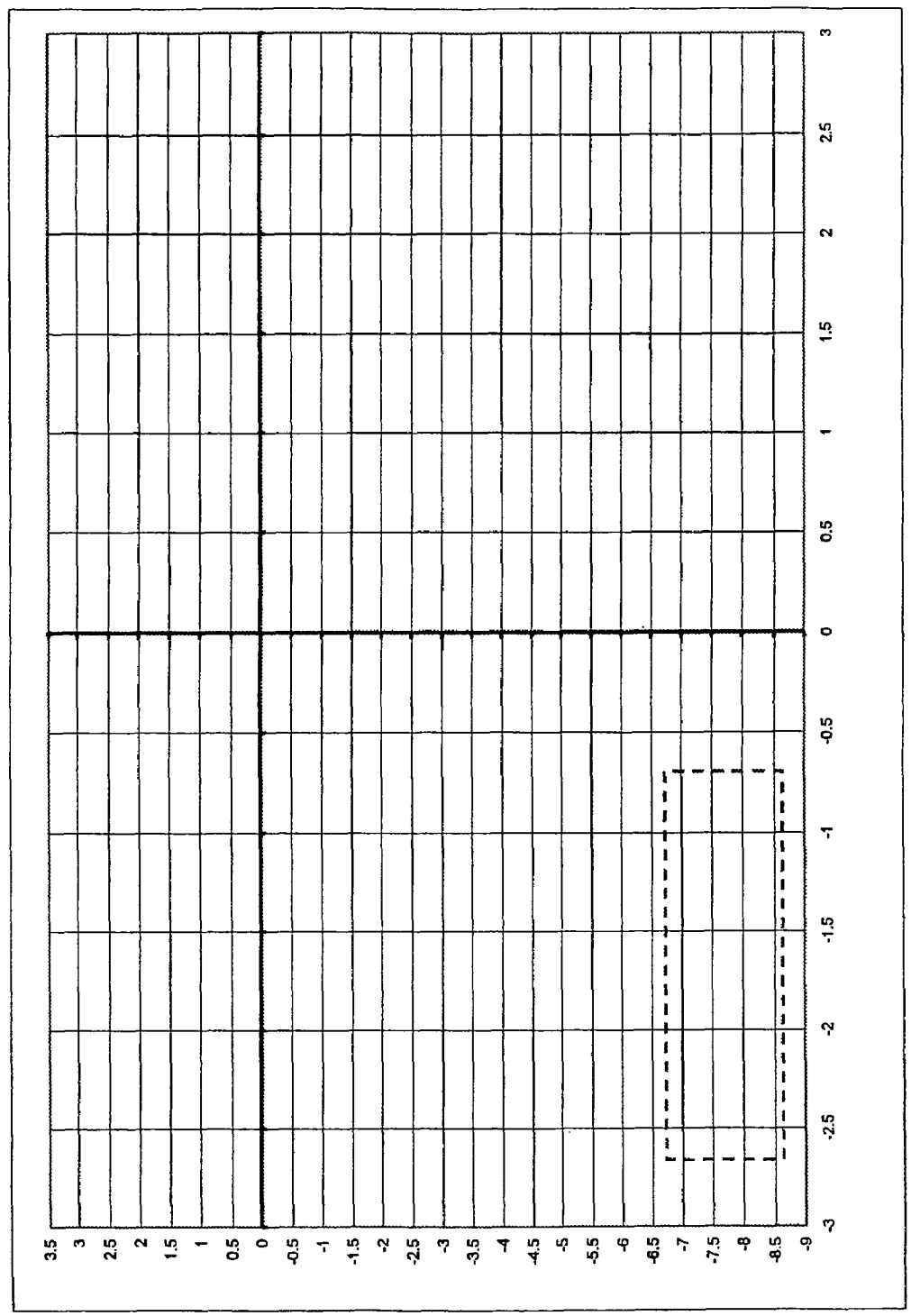
FIG. 7 is a graph of the transmitted color of an insulating glass unit carrying a low solar reflectance coating in accordance with certain embodiments of the invention.

The present IG unit 8 exhibits a transmitted color that is particularly pleasing. As noted above, it is commonly desirable for windows to exhibit hues of blue or blue-green, with blue commonly being especially desired. The transmitted hue of the present IG unit 8 falls entirely within the blue-green range. In particular, the present IG unit 8 exhibits a transmitted color characterized by an $a_h$ color coordinate of between about −0.5 and about −3 and a $b_h$ color coordinate of between about −6.5 and about −9. In certain preferred embodiments (e.g., where the low solar reflectance coating 40 is one of the five uniquely preferred film stacks detailed below), the IG unit 8 exhibits a transmitted color characterized by an $a_h$ color coordinate of between about −0.7 and about −2.7 and a $b_h$ color coordinate of between about −6.7 and about −8.7. This can be appreciated with reference to FIG. 7, wherein the transmitted color of such an IG unit 8 is represented by the color range defined by the dashed lines. In this figure, it can be appreciated that the transmitted $a_h$ and $b_h$ color values are both negative, such that the transmitted hue is in the blue-green range. Further, the magnitude of the negative $b_h$ value is much greater than that of the negative $a_h$ value, such that the transmitted color is predominantly blue. Thus, when the present low solar reflectance coating 40 is provided on an IG unit, the resulting unit 8 exhibits a particularly pleasing transmitted color. As a result, the present coating 40 is especially desirable for applications where transmitted color is of particular interest, such as in sunrooms, solariums, greenhouses, and the like.

Figure 8:
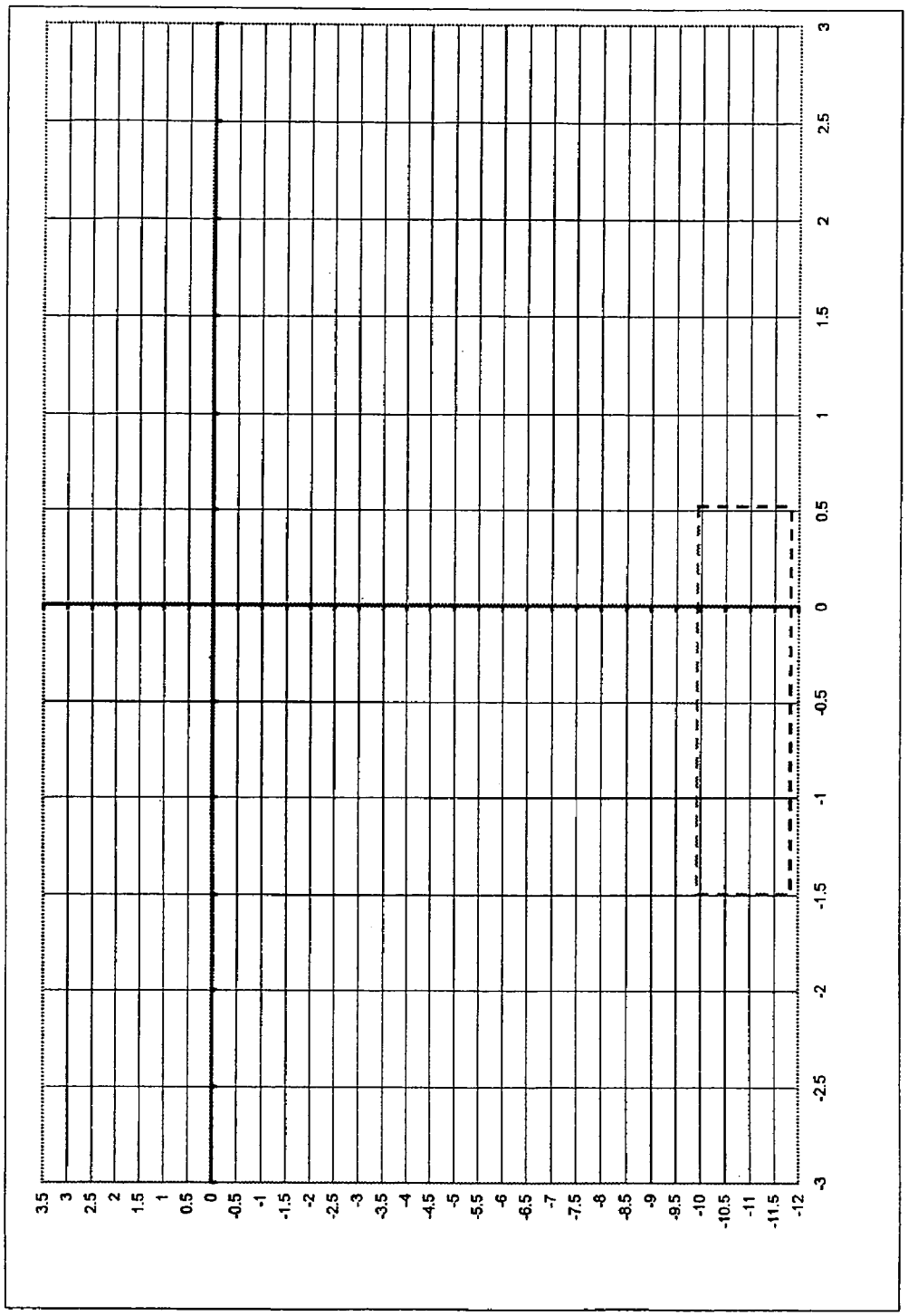
FIG. 8 is a graph of the reflected color of an insulating glass unit carrying a low solar reflectance coating in accordance with certain embodiments of the invention.

The present IG unit 8 also exhibits a pleasing reflected color. The reflected color reported herein is measured from the exterior 77' of the IG unit 8 (i.e., off the glass side 12 of the first pane 10). The reflected hue of the present IG unit 8 is largely within the blue-green range. In particular, the IG unit 8 exhibits a reflected color characterized by an $a_h$ color coordinate of between about 0.75 and about −1.75 and a $b_h$ color coordinate of between about −9.75 and about −12.25. In certain preferred embodiments (e.g., where the coating 40 is one of the five uniquely preferred film stacks detailed below), the IG unit 8 exhibits a reflected color characterized by an $a_h$ color coordinate of between about 0.6 and about −1.5 and a $b_h$ color coordinate of between about −9.9 and about −11.9. This is shown in FIG. 8, wherein the exterior reflected color of such an IG unit 8 is represented by the color range defined by the dashed lines. In this figure, it can be appreciated that the reflected $b_h$ color values are entirely negative, and a large portion of the reflected $a_h$ values are negative. Thus, the reflected hue of the IG unit 8 falls largely within the blue-green range. Further, the magnitude of the negative $b_h$ value is much greater than the magnitude of the $a_h$ value, such that the transmitted color is predominantly blue. Thus, the low solar reflectance coating 40 imparts a pleasing reflected color in the present IG unit 8.

In addition to the beneficial properties discussed above, the present IG unit 8 has desirable thermal insulating properties. As noted above, the low solar reflectance coating 40 includes at least one infrared-reflective film 150. This film 150 is highly reflective of infrared radiation (i.e., radiant heat). Since the infrared-reflective film 150 is typically formed of silver or another electrically conductive material, this film 150 contributes low emissivity to the low solar reflectance coating 40. For example, the emissivity of the present coating 40 is less than about 0.12. In fact, the emissivity of this coating 40 is less than about 0.1. While the precise level of emissivity can be selected and varied in accordance with the present teachings, a number of preferred coating embodiments (e.g., the five uniquely preferred film stacks detailed below) provide an emissivity of about 0.095. In contrast, an uncoated pane of clear glass would typically have an emissivity of about 0.84.

The term "emissivity" is well known in the present art. This term is used herein in accordance with its well known meaning to refer to the ratio of radiation emitted by a surface to the radiation emitted by a blackbody at the same temperature. The present emissivity values can be determined as specified in "Standard Test Method For Emittance Of Specular Surfaces Using Spectrometric Measurements" NFRC 301-93, the entire teachings of which are incorporated herein by reference.

The "U Value" of the present IG unit 8 is also quite low. As is well known, the U Value of an IG unit is a measure of the thermal insulating ability of the unit. The smaller the U value the better the thermal insulating ability of the unit. The U Value of the present IG unit 8 is less than about 0.4. In fact, the present IG unit 8 has U Value of less than about 0.3. While the precise level of U Value can be selected and varied in accordance with the present teachings, certain preferred embodiments (e.g., where the coating 40 is one of the five uniquely preferred film stacks detailed below) provide an IG unit 8 wherein the U Value is about 0.27. In comparison, the U Value of an IG unit having panes of uncoated glass would typically be about 0.46. Thus, the present low solar reflectance coating 40 can be provided on an IG unit to substantially lower the U Value of the unit (i.e., to substantially improve the thermal insulating property of the unit).

The term U Value is well known in the art. It is used herein in accordance with its well known meaning to express the amount of heat that passes through one unit of area in one unit of time for each unit of temperature difference between a hot side of the IG unit 8 and a cold side of the IG unit 8. The U Value can be determined in accordance with the standard specified for $U_{winter}$ in NFRC 100-91 (1991), the entire teachings of which are incorporated herein by reference.

As noted above, the present low solar reflectance coating 40 includes an infrared-reflective film 150. This infrared-reflective film 150 is preferably formed of an electrically conductive material (e.g., metal), such as silver, gold, copper, or the like. Alloys or mixtures of these metals can also be used. In most cases, it will be preferable to employ a silver or silver-containing film (e.g., comprising a major weight percentage of silver). The term "silver-containing" is used herein to refer to any film that includes at least some silver. For example, one may provide an infrared-reflective film in the form of silver combined with a small amount of gold (e.g., about 5% gold or less).

The infrared-reflective film 150 is highly reflective of infrared radiation. As a result, this film 150 substantially reduces the transmission of radiant heat through the coating 40. Further, the electrically-conductive material of this film 150 has low sheet resistance, and hence low emissivity. Thus, the infrared-reflective film 150 contributes low emissivity to the coating 40. As noted above, these properties are desirable for coatings on windows and other glazings (e.g., doors, skylights, etc.). For example, during a cold winter it is desirable to minimize the heat that escapes from a warm room through a window to a cold outdoor environment. Likewise, during a warm summer it is desirable to minimize the heat that enters a cool room through a window from a hot outdoor environment. The infrared-reflective film 150 in the present coating 40 is advantageous in that it helps reduce the amount of heat that passes through the coating 40.

Figure 2:
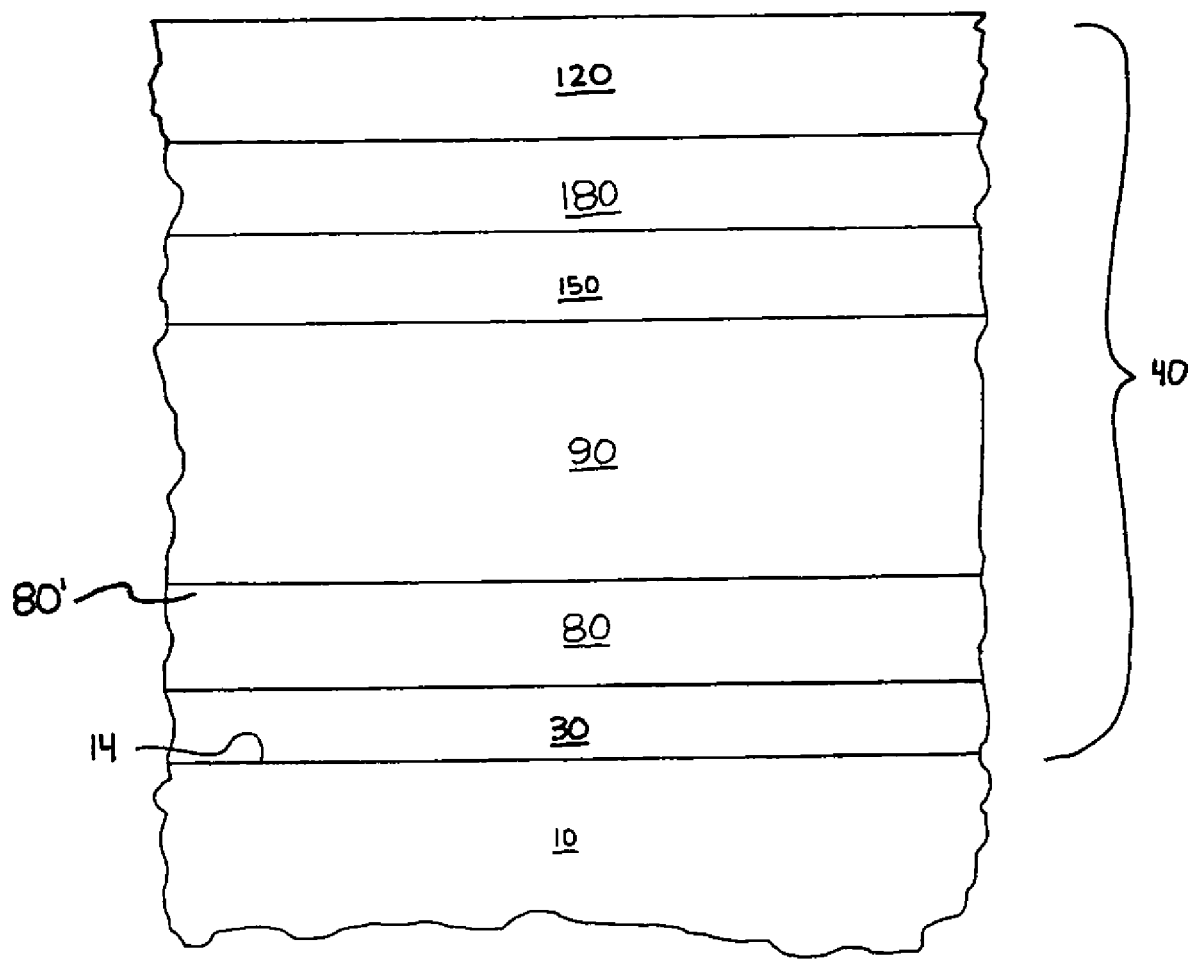
FIG. 2 is a schematic cross-sectional view of a low solar reflectance coating in accordance with certain embodiments the invention.

FIG. 2 depicts one preferred low solar reflectance coating 40 of the invention. In this figure, the infrared-reflective film is denoted by the reference numeral 150. The thickness of this film 150 is preferably at least about 50 angstroms, more preferably at least about 75 angstroms, and perhaps optimally at least about 95 angstroms. In certain embodiments, the thickness of this film 150 is between about 100 angstroms and about 160 angstroms. In one preferred embodiment, this film 150 has a thickness of between about 110 angstroms and about 148 angstroms. While these ranges are preferred, the thickness of this layer 150 can be varied substantially to meet the requirements of different applications.

The low solar reflectance coating 40 also includes a high absorption primary layer 80. This primary layer 80 comprises titanium or another material that is highly absorptive of solar radiation. The high absorption primary layer 80 absorbs a substantial portion of incident solar radiation. In certain embodiments, the high absorption primary layer 80 is a titanium-containing film (i.e., a film containing at least some titanium). In certain preferred embodiments, the primary layer 80 comprises metallic titanium or another highly absorptive metallic material. In some cases, this layer 80 consists, or consists essentially, of a highly absorptive metal (e.g., titanium). In other cases, only a portion of this layer 80 is metallic. For example, an outer portion (i.e., the portion furthest from the substrate 10) of the high absorption primary layer 80 can be oxidized, nitrided, or otherwise reacted to some extent. This would be the case when the high absorption primary layer 80 is deposited as metallic film (e.g., as metallic titanium), and the deposition of a subsequent film is performed in a reactive (e.g., oxidizing and/or nitriding) atmosphere. In such cases, the outer face of the primary layer 80 would be exposed to the reactive atmosphere during an initial period of depositing the subsequent film, such that the outer portion 80' of the primary layer 80 is oxidized, nitrided, or otherwise reacted. In many cases, it will be advantageous if only a minor portion (e.g., less than 50% of the thickness) of the primary layer 80 is a reaction product (e.g., an oxide and/or nitride), while a major portion (e.g., 50% or more of the thickness) thereof is metallic. This will typically provide particularly high absorption, since metal oxides and other dielectric reaction products tend to be less absorptive than their respective metals (although in certain alternate embodiments the primary layer 80 comprises, e.g., is deposited as, a highly absorptive dielectric, such as titanium nitride). Accordingly, certain embodiments involve a high absorption primary layer 80 that consists, or consists essentially, of a highly absorptive metal (e.g., titanium) and reaction products (e.g., oxides, nitrides, and/or oxynitrides) of such metal.

FIG. 2 depicts a low solar reflectance coating 40 wherein the high absorption primary layer is denoted by the reference numeral 80. The thickness of this layer 80 will typically be at least about 100 angstroms, preferably at least about 110 angstroms, and more preferably at least about 115 angstroms. In certain particularly preferred embodiments, the thickness of this layer 80 is between about 115 angstroms and about 185 angstroms. While these ranges are preferred, the thickness of this layer 80 can be varied substantially to meet the requirements of different applications.

In certain particularly preferred embodiments, the high absorption primary layer 80 comprises titanium. In one embodiment, this layer 80 is a titanium-containing film having a thickness of between about 115 angstroms and about 185 angstroms. The term "titanium-containing" is used herein to refer to any film that contains at least some titanium. Thus, absent an express statement to the contrary, materials other than titanium may be present in such a film. In some cases, the high absorption primary layer 80 is a titanium-containing film that consists, or consists essentially, of titanium. In other cases, this layer 80 is a titanium-containing film having an outer portion 80' that is a reaction product of titanium (e.g., titanium oxide, titanium nitride, and/or titanium oxynitride). In these cases, it will generally be preferred if a major inner portion (i.e., 50% or more) of the thickness of the titanium-containing film is metallic titanium, while a minor outer portion (i.e., less than 50%) is a titanium reaction product. For example, the high absorption primary layer 80 can be a titanium-containing film wherein metallic titanium accounts for at least about 58 angstroms of the thickness of this layer 80 (e.g., where the innermost 58 Å or more is metallic titanium).

In certain embodiments, the high absorption primary layer 80 comprises niobium. In one embodiment, this layer 80 is a niobium-containing film having a thickness of between about 115 angstroms and about 185 angstroms. The term "niobium-containing" is used herein to refer to any film that contains at least some niobium. Thus, absent an express statement to the contrary, materials other than niobium may be present in such a film. In some cases, the high absorption primary layer 80 is a niobium-containing film that consists, or consists essentially, of niobium. In other cases, this layer 80 is a niobium-containing film having an outer portion 80' that is a reaction product of niobium (e.g., niobium oxide, niobium nitride, and/or niobium oxynitride). In these cases, it will generally be preferred if a major inner portion of the thickness of the niobium-containing film is metallic niobium, while a minor outer portion is a niobium reaction product. For example, the high absorption primary layer 80 can be a niobium-containing film wherein metallic niobium accounts for at least about 58 angstroms of the thickness of this layer 80 (e.g., where the innermost 58 Å or more is metallic niobium).

In certain embodiments, the high absorption primary layer 80 comprises both niobium and titanium. In one embodiment, this layer 80 is a niobium-titanium-containing film having a thickness of between about 115 angstroms and about 185 angstroms. The term "niobium-titanium-containing" is used herein to refer to any film that contains at least some niobium and at least some titanium. Thus, absent an express statement to the contrary, materials other than niobium and titanium may be present in such a film. Useful niobium-titanium films and methods for their deposition are described in U.S. patent application Ser. No. 10/123,032, filed on Apr. 11, 2002 and entitled "Thin Film Coating Having Niobium-Titanium Layer", the entire teachings of which are incorporated herein by reference. In some cases, the high absorption primary layer 80 is a niobium-titanium-containing film that consists, or consists essentially, of niobium and titanium. In other cases, this layer 80 is a niobium-titanium-containing film having an outer portion 80' that is a reaction product of a niobium-titanium material. In these cases, it will generally be preferred if a major inner portion of the thickness of this niobium-titanium-containing film is metallic niobium-titanium (e.g., an alloy of niobium and titanium), while a minor outer portion is a niobium-titanium reaction product. For example, the high absorption primary layer 80 can be a niobium-titanium-containing film wherein metallic niobium-titanium accounts for at least about 58 angstroms of the thickness of this layer 80 (e.g., where the innermost 58 Å or more is metallic niobium-titanium).

In certain embodiments, the high absorption primary layer 80 comprises a dielectric film that is highly absorptive of solar radiation. In one embodiment of this nature, the high absorption primary layer 80 comprises (e.g., consists essentially of) titanium nitride. Of course, skilled artisans may wish to select other known high absorption films.

As noted above, the high absorption primary layer 80 is preferably positioned further to the exterior 77' than the infrared-reflective reflective layer 150. Thus, when the low solar reflectance coating 40 is born on the #2 surface of the IG unit 8, the high absorption primary layer 80 is preferably positioned closer to the first pane 10 than the infrared-reflective reflective layer 150. This can be appreciated by referring to FIG. 4A.

In a number of particularly preferred embodiments, the present coating 40 is provided with a high absorption blocker layer 180. This blocker layer 180 is preferably deposited directly over the infrared-reflective film 150, as shown in FIGS. 2 and 4A. When provided, the high absorption blocker layer 180 serves a number of purposes. For example, this layer 180 protects the underlying infrared-reflective film 150 during the deposition of subsequent films as well as during tempering and other heat treatments. The blocker layer 180 preferably comprises a metal or metal alloy that reacts readily with oxygen, nitrogen, or other reactive gas used in depositing subsequent films. This allows the blocker layer 180 to capture reactive oxygen, nitrogen, etc. that would otherwise reach and react with the infrared-reflective film 150. The high absorption blocker layer 180 has been found to provide the infrared-reflective film 150 with an exceptional degree of protection against chemical corrosion. This is believed to be a result of the relatively great thickness of the high absorption blocker layer 180 (at least about 75 angstroms), as compared to conventional blocker layers. The present coating 40 has been found to have outstanding chemical durability, and this is attributed in part to the protective properties of the high absorption blocker layer 180. Another advantageous aspect of the high absorption blocker layer 180 is that it affords exceptional control over the transmitted color of the coating 40. Thus, the pleasing transmitted color (which is highly coveted for sunrooms, solariums, greenhouses, and the like) of the present IG unit 8 is largely attributed to the high absorption blocker layer 180.

In a number of particularly preferred embodiments, the high absorption blocker layer 180 comprises titanium. For example, the high absorption blocker layer can be deposited as a titanium-containing film. In certain embodiments, the blocker layer 180 is a titanium-containing film having a thickness of at least about 75 angstroms. In such embodiments, the thickness of this layer 180 is preferably between about 90 angstroms and about 196 angstroms, more preferably between about 96 angstroms and about 188 angstroms, and perhaps optimally between about 102 angstroms and about 180 angstroms. The high absorption blocker layer 180 can be a titanium-containing film that consists, or consists essentially, of titanium. Alternatively, this layer 180 can be a titanium-containing film having an outer portion that is a reaction product of titanium (e.g., titanium oxide, titanium nitride, and/or titanium oxynitride). In these cases, it will generally be preferred if a major inner portion of the thickness of the titanium-containing film is metallic titanium, while a minor outer portion is a titanium reaction product. For example, the high absorption blocker layer 180 can be a titanium-containing film wherein metallic titanium accounts for at least about 38 angstroms of the thickness of this layer 180 (e.g., where the innermost 38 Å or more is metallic titanium).

In certain embodiments, the high absorption blocker layer 180 comprises niobium. In some embodiments of this nature, the high absorption blocker layer 180 is a niobium-containing film having a thickness of at least about 75 angstroms. In such embodiments, the thickness of the high absorption blocker layer 180 is preferably between about 90 angstroms and about 196 angstroms, more preferably between about 96 angstroms and about 188 angstroms, and perhaps optimally between about 102 angstroms and about 180 angstroms. The high absorption blocker layer 180 can be a niobium-containing film that consists, or consists essentially, of niobium. Alternatively, this layer 180 can be a niobium-containing film having an outer portion that is a niobium reaction product. In such cases, it will generally be preferred if a major inner portion of the thickness of the niobium-containing film is metallic niobium, while a minor outer portion is a niobium reaction product. For example, the high absorption blocker layer 180 can be a niobium-containing film wherein metallic niobium accounts for at least about 38 angstroms of the thickness of this layer 180 (e.g., where the innermost 38 Å or more is metallic niobium).

In certain embodiments, the high absorption blocker layer 180 comprises both niobium and titanium. In some embodiments of this nature, the high absorption blocker layer 180 is a niobium-titanium-containing film having a thickness of at least about 75 angstroms. In such embodiments, the thickness of the high absorption blocker layer 180 is preferably between about 90 angstroms and about 196 angstroms, more preferably between about 96 angstroms and about 188 angstroms, and perhaps optimally between about 102 angstroms and about 180 angstroms. The high absorption blocker layer 180 can be a niobium-titanium-containing film that consists, or consists essentially, of a niobium-titanium material (e.g., alloys of niobium and titanium or other compounds comprising these two materials). Alternatively, the high absorption blocker layer 180 can be a niobium-titanium-containing film having an outer portion that is a reaction product of niobium-titanium. In such cases, it will generally be preferred if a major inner portion of the thickness of the niobium-titanium-containing film is metallic niobium-titanium, while a minor outer portion is present in the form of a niobium-titanium reaction product. For example, the high absorption blocker layer 180 can be a niobium-titanium-containing film wherein metallic niobium-titanium accounts for at least about 38 angstroms of the thickness of this layer 180 (e.g., where the innermost 38 Å or more is metallic niobium-titanium).

Preferably, the low solar reflectance coating 40 is provided with an inner coat 30 and an outer coat 120 to reduce the visible reflectance of the coating 40. The preferred inner coat 30 is positioned between the substrate 10 and the high absorption primary layer 80, while the preferred outer coat 120 is positioned further from the substrate 10 than the infrared-reflective layer 150. In some cases, the inner coat 30 is contiguous to the substrate 10. However, the invention also provides embodiments wherein a transparent base layer 20 (not shown) is positioned between the inner coat 30 and the substrate 10. Useful transparent base layers 20 are described in U.S. patent application Ser. No. 10/087,662, the entire teachings of which are incorporated herein by reference. In certain embodiments, the outer coat 120 forms the outermost film region of the present coating 40. Alternatively, a variety of overcoats can be positioned further from the substrate 10 than the preferred outer coat 120, if so desired.

When provided, the inner 30 and outer 120 coats each comprise at least one transparent dielectric film. The term "transparent dielectric" is used herein to refer to any non-metallic (i.e., neither a pure metal nor a metal alloy) compound that includes any one or more metals and is substantially transparent when deposited as a thin film. For example, included in this definition would be any metal oxide, metal nitride, metal carbide, metal sulfide, metal boride, and any combination thereof (e.g., an oxynitride). Further, the term "metal" should be understood to include all metals and semi-metals (i.e., metalloids). In particular, useful metal oxides include oxides of zinc, tin, indium, bismuth, titanium, hafnium, zirconium, and alloys and mixtures thereof. While metal oxides are advantageous due to their ease and low cost of application, metal nitrides (e.g., silicon nitride, titanium nitride, etc.) can also be used quite advantageously. Skilled artisans will be familiar with other useful transparent dielectric materials.

The optional inner coat 30 can comprise essentially any desired transparent dielectric material. The physical thickness of the inner coat 30 is preferably between about 75 angstroms and about 200 angstroms, more preferably between about 85 angstroms and about 155 angstroms, and perhaps optimally between about 95 angstroms and about 142 angstroms. While these ranges will commonly be preferred, the thickness of the optional inner coat 30 can be varied to meet the requirements of different applications. In a first embodiment, the inner coat 30 is a single zinc oxide film. In a second embodiment, the inner coat 30 is a single titanium oxide film (e.g., titanium dioxide and/or substoichiometric $TiO_x$, where x is less than 2). In a third embodiment, the inner coat 30 is a single silicon nitride film. In a fourth embodiment, the inner coat 30 is a single tin oxide film. In each of these four embodiments, the thickness of the inner coat 30 is preferably within at least one of the ranges described in this paragraph.

In certain alternate embodiments (not shown), the inner coat 30 comprises at least two films. The inner coat 30 can be formed of essentially any desired number of films. Preferably, the total optical thickness of the inner coat 30 (whether it consists of one or multiple films) is between about 150 angstroms and about 400 angstroms, more preferably between about 170 angstroms and about 310 angstroms, and perhaps optimally between about 190 angstroms and about 284 angstroms. In certain embodiments, each film of the inner coat 30 is a transparent dielectric film having a refractive index of between about 1.7 and about 2.4, and perhaps optimally of about 2.0.

The exceptional optical properties of the present coating 40 are due in part to the thinness of the preferred inner coat 30. Excellent antireflection and color is achieved by providing the preferred inner coat 30 at an optical thickness of less than about 400 Å, more preferably less than about 310 Å, and perhaps optimally less than about 284 Å, while desirably having an optical thickness of at least about 150 Å.

The optional outer coat 120 can also comprise essentially any desired transparent dielectric material. The physical thickness of the outer coat 120 is preferably between about 100 angstroms and about 300 angstroms, or more preferably between about 130 angstroms and about 240 angstroms, and perhaps optimally between about 150 angstroms and about 220 angstroms. While these ranges will commonly be preferred, the thickness of the optional outer coat 120 can be varied to meet the requirements of different applications. In a first embodiment, the outer coat 120 is a single zinc oxide film. In a second embodiment, the outer coat 120 is a single titanium oxide film. In a third embodiment, the outer coat 120 is a single silicon nitride film. In a fourth embodiment, the outer coat 120 is a single tin oxide film. In each of these four embodiments, the thickness of the outer coat 120 preferably is within at least one of the ranges described in this paragraph. The thicknesses noted herein are physical thicknesses, unless specifically identified as being optical thicknesses.

In a number of preferred embodiments (not shown), the outer coat 120 comprises at least two films. As with the inner coat 30, the outer coat 120 can be formed of essentially any desired number of films. Preferably, the total optical thickness of the outer coat 120 (whether it consists of one or multiple films) is between about 200 angstroms and about 600 angstroms, more preferably between about 260 angstroms and about 480 angstroms, and perhaps optimally between about 300 angstroms and about 440 angstroms. In certain embodiments, each film of the outer coat 120 is a transparent dielectric film having a refractive index of between about 1.7 and about 2.4, and perhaps optimally of about 2.0.

In certain preferred embodiments, the outer coat 120 comprises two outer films of different transparent dielectric materials. These films can be formed respectively of essentially any two transparent dielectric materials. In some cases, these films are contiguous to one another, although this is not required. In one embodiment, the outer coat 120 comprises a first layer of zinc oxide and a second layer of silicon nitride positioned over (e.g., directly over) the zinc oxide layer. Alternatively, the first layer can be titanium oxide and the second layer can be silicon nitride. As still another alternative, the first layer can be tin oxide and the second layer can be silicon nitride. As yet another alternative, the first layer can be zinc oxide and the second layer can be titanium oxide or tin oxide. The respective thicknesses of these two outer films can be selected and varied as desired. Preferably, the combined optical thickness of these two outer films is within at least one of the ranges described in the preceding paragraph.

In embodiments wherein the outer coat 120 comprises multiple films, the outermost of these films preferably comprises a chemically-durable material, such as silicon nitride. U.S. Pat. No. 5,834,103, the entire teachings of which are incorporated herein by reference, describes silicon nitride films that can be used as the outermost film in the outer coat 120 of the present coating 40. In certain particularly preferred embodiments, the outermost film of the present coating 40 is silicon nitride deposited at a thickness of between about 32 angstroms and about 58 angstroms, more preferably between about 35 angstroms and about 56 angstroms, and perhaps optimally between about 37 angstroms and about 53 angstroms.

A chemically-durable film of the nature (e.g., of the thickness and composition) just described can advantageously be deposited over (i.e., further from the substrate than) an underlying, outer transparent dielectric film having a thickness of between about 100 angstroms and about 186 angstroms, more preferably of between about 106 angstroms and about 180 angstroms, and perhaps optimally between about 112 angstroms and about 171 angstroms. In certain embodiments, this underlying (e.g., directly underlying) transparent dielectric film is formed of zinc oxide, titanium oxide, or tin oxide. In particular, the high sputtering rate of zinc oxide makes it an advantageous material to use for this underlying transparent dielectric layer.

The exceptional optical properties of the present coating 40 are due in part to the thinness of the preferred outer coat 120. Excellent antireflection and color is achieved by providing the preferred outer coat 120 at an optical thickness of less than about 600 angstroms, more preferably less than about 480 angstroms, and perhaps optimally about 440 angstroms, while desirably having an optical thickness of at least about 200 angstroms.

The low solar reflectance coating 40 is preferably provided with a middle coat 90 between the high absorption primary layer 80 and the infrared-reflective layer 150. The preferred middle coat 90 comprises at least one transparent dielectric film. If so desired, the middle coat 90 can be provided in the form of a single transparent dielectric film. This film can comprise any of the transparent dielectric materials described above. In one embodiment, the middle coat 90 is a single zinc oxide film. When the middle coat 90 is provided in the form of a single film, the physical thickness of this film 90 is preferably between about 300 angstroms and about 900 angstroms, more preferably between about 410 angstroms and about 660 angstroms, and perhaps optimally between about 438 angstroms and about 633 angstroms. While these ranges are preferred, the thickness of the middle coat 90 can be varied to meet the requirements of different applications.

In a number of preferred embodiments (not shown), the middle coat 90 is provided in the form of a plurality of transparent dielectric films. Whether the middle coat 90 consists of one or multiple films, the overall optical thickness of this coat 90 is preferably between about 600 angstroms and about 1,800 angstroms, more preferably between about 820 angstroms and about 1,320 angstroms, and perhaps optimally between about 876 angstroms and about 1,266 angstroms. In certain embodiments, each film in the middle coat 90 is a transparent dielectric film having a refractive index of between about 1.7 and about 2.4, and perhaps optimally of about 2.0.

In certain preferred embodiments, the middle coat 90 comprises three transparent dielectric films. These three films can be formed of essentially any desired transparent dielectric materials. In some cases, these films are contiguous to one another, although this is not required. While the respective thicknesses of these three intermediate films can be varied as desired, their combined optical thickness preferably falls within at least one of the ranges described in the preceding paragraph. In some cases, two of these films (e.g., the innermost and outermost) are zinc oxide, while the other (e.g., the middle) is titanium dioxide. Alternatively, two of these films (e.g., the innermost and outermost) can be zinc oxide, while the other (e.g., the middle) is silicon nitride. As still another alternative, two of these films (e.g., the innermost and outermost) can be zinc oxide, while the other (e.g., the middle) is tin oxide. Many other combinations can be used as well.

Certain particularly preferred embodiments involve a middle coat 90 comprising a titanium dioxide film sandwiched between (e.g., directly between) two zinc oxide films. In some embodiments of this nature, the titanium dioxide film is less thick than each of the zinc oxide films, although the titanium oxide film preferably has a thickness of at least about 50 angstroms, and more preferably of at least about 60 angstroms. In such embodiments, a preferred thickness range for the titanium dioxide film is between about 65 angstroms and about 103 angstroms, while a preferred thickness range for the innermost zinc oxide film is between about 238 angstroms and about 422 angstroms, and a preferred thickness range for the outermost zinc oxide film is between about 80 angstroms and about 172 angstroms. It is advantageous to provide a major portion of the middle coat 90 in the form of zinc oxide, given the high sputtering rate of zinc oxide. Whether the middle coat consists of one or multiple films, it will commonly be preferable (e.g., when the infrared-reflective film 150 is silver) if the outermost portion of the middle coat 90 (e.g., the portion directly beneath the infrared-reflective layer 150) is formed of zinc oxide, as zinc oxide has been found to promote good silver growth.

The exceptional optical properties of the present coating 40 are due in part to the relative optical thicknesses of the preferred inner coat 30, the preferred middle coat 90, and the preferred outer coat 120. For example, in certain embodiments, there is provided a specific ratio of the optical thickness of the inner coat 30 relative to the optical thickness of the middle coat 90. Alternatively or additionally, there can be provided a specific ratio of the optical thickness of the outer coat 120 relative to the optical thickness of the middle coat 90.

In certain embodiments, the ratio of the optical thickness of the inner coat 30 relative to the optical thickness of the middle coat 90 preferably is between about 0.15 and about 0.32, more preferably is between about 0.2 and about 0.23, and perhaps optimally is about 0.21-0.22. Further, in certain embodiments, the ratio of the optical thickness of the outer coat 120 relative to the optical thickness of the middle coat 90 is preferably between about 0.24 and about 0.5, more preferably between about 0.31 and about 0.4, and perhaps optimally is about 0.34-0.35. In certain preferred embodiments, the coating 40 has one of the foregoing ratios of inner coat/middle coat as well as one of the foregoing ratios of outer coat/middle coat.

Five uniquely preferred low solar reflectance film stack 40 embodiments will now be detailed. Each of these film stacks is preferably utilized as a so-called second surface coating. In particular, where one of these film stacks is born on the #2 surface of an IG unit, the resulting unit 8 achieves all of the beneficial properties noted above. While the present disclosure focuses somewhat on IG unit embodiments, it is to be understood that the invention extends to any substrate (e.g., a monolithic pane or a flexible sheet) carrying the present low solar reflectance, low-emissivity coating 40.

A first uniquely preferred low solar reflectance, low-emissivity film stack has the following structure: (1) a zinc oxide layer deposited directly upon a glass sheet at a thickness of about 118 angstroms; (2) a titanium layer deposited directly upon this zinc oxide layer at a thickness of about 147 angstroms, wherein an outer portion of this titanium layer is oxidized during deposition of the overlying zinc oxide film in an oxidizing atmosphere; (3) a zinc oxide layer deposited directly upon this titanium layer at a thickness of about 352 angstroms; (4) a titanium dioxide layer deposited directly upon this zinc oxide layer at a thickness of about 73 angstroms; (5) a zinc oxide layer deposited directly upon this titanium dioxide layer at a thickness of about 101 angstroms; (6) a silver layer deposited directly upon this zinc oxide layer at a thickness of about 126 angstroms; (6) a titanium layer deposited directly upon this silver layer at a thickness of about 138 angstroms, wherein an outer portion of this titanium layer is oxidized during deposition of the overlying zinc oxide film in an oxidizing atmosphere; (7) a zinc oxide layer deposited directly upon this titanium layer at a thickness of about 155 angstroms; and (8) a silicon nitride layer deposited directly upon this zinc oxide layer at a thickness of about 43 angstroms.

A second uniquely preferred low solar reflectance, low-emissivity film stack has the following structure: (1) a zinc oxide layer deposited directly upon a glass sheet at a thickness of about 107 angstroms; (2) a titanium layer deposited directly upon this zinc oxide layer at a thickness of about 139 angstroms, wherein an outer portion of this titanium layer is oxidized during deposition of the overlying zinc oxide film in an oxidizing atmosphere; (3) a zinc oxide layer deposited directly upon this titanium layer at a thickness of about 318 angstroms; (4) a titanium dioxide layer deposited directly upon this zinc oxide layer at a thickness of about 93 angstroms; (5) a zinc oxide layer deposited directly upon this titanium dioxide layer at a thickness of about 140 angstroms; (6) a silver layer deposited directly upon this zinc oxide layer at a thickness of about 127 angstroms; (7) a titanium layer deposited directly upon this silver layer at a thickness of about 139 angstroms, wherein an outer portion of this titanium layer is oxidized during deposition of the overlying zinc oxide film in an oxidizing atmosphere; (8) a zinc oxide layer deposited directly upon this titanium layer at a thickness of about 125 angstroms; and (9) a silicon nitride layer deposited directly upon this zinc oxide layer at a thickness of about 43 angstroms.

A third uniquely preferred low solar reflectance, low-emissivity film stack has the following structure: (1) a zinc oxide layer deposited directly upon a glass sheet at a thickness of about 114 angstroms; (2) a titanium layer deposited directly upon this zinc oxide layer at a thickness of about 169 angstroms, wherein an outer portion of this titanium layer is oxidized during deposition of the overlying zinc oxide film in an oxidizing atmosphere; (3) a zinc oxide layer deposited directly upon this titanium layer at a thickness of about 297 angstroms; (4) a titanium dioxide layer deposited directly upon this zinc oxide layer at a thickness of about 85 angstroms; (5) a zinc oxide layer deposited directly upon this titanium dioxide layer at a thickness of about 134 angstroms; (6) a silver layer deposited directly upon this zinc oxide layer at a thickness of about 124 angstroms; (7) a titanium layer deposited directly upon this silver layer at a thickness of about 163 angstroms, wherein an outer portion of this titanium layer is oxidized during deposition of the overlying zinc oxide film in an oxidizing atmosphere; (8) a zinc oxide layer deposited directly upon this titanium layer at a thickness of about 152 angstroms; and (9) a silicon nitride layer deposited directly upon this zinc oxide layer at a thickness of about 48 angstroms.

A fourth uniquely preferred low solar reflectance, low-emissivity film stack has the following structure: (1) a zinc oxide layer deposited directly upon a glass sheet at a thickness of about 112 angstroms; (2) a titanium layer deposited directly upon this zinc oxide layer at a thickness of about 133 angstroms, wherein an outer portion of this titanium layer is oxidized during deposition of the overlying zinc oxide film in an oxidizing atmosphere; (3) a zinc oxide layer deposited directly upon this titanium layer at a thickness of about 309 angstroms; (4) a titanium dioxide layer deposited directly upon this zinc oxide layer at a thickness of about 84 angstroms; (5) a zinc oxide layer deposited directly upon this titanium dioxide layer at a thickness of about 143 angstroms; (6) a silver layer deposited directly upon this zinc oxide layer at a thickness of about 133 angstroms; (7) a titanium layer deposited directly upon this silver layer at a thickness of about 114 angstroms, wherein an outer portion of this titanium layer is oxidized during deposition of the overlying zinc oxide film in an oxidizing atmosphere; (8) a zinc oxide layer deposited directly upon this titanium layer at a thickness of about 142 angstroms; and (9) a silicon nitride layer deposited directly upon this zinc oxide layer at a thickness of about 41 angstroms.

A fifth uniquely preferred low solar reflectance, low-emissivity film stack has the following structure: (1) a zinc oxide layer deposited directly upon a glass sheet at a thickness of about 129 angstroms; (2) a titanium layer deposited directly upon this zinc oxide layer at a thickness of about 130 angstroms, wherein an outer portion of this titanium layer is oxidized during deposition of the overlying zinc oxide film in an oxidizing atmosphere; (3) a zinc oxide layer deposited directly upon this titanium layer at a thickness of about 319 angstroms; (4) a titanium dioxide layer deposited directly upon this zinc oxide layer at a thickness of about 84 angstroms; (5) a zinc oxide layer deposited directly upon this titanium dioxide layer at a thickness of about 139 angstroms; (6) a silver layer deposited directly upon this zinc oxide layer at a thickness of about 134 angstroms; (7) a titanium layer deposited directly upon this silver layer at a thickness of about 114 angstroms, wherein an outer portion of this titanium layer is oxidized during deposition of the overlying zinc oxide film in an oxidizing atmosphere; (8) a zinc oxide layer deposited directly upon this titanium layer at a thickness of about 140 angstroms; and (9) a silicon nitride layer deposited directly upon this zinc oxide layer at a thickness of about 47 angstroms.

Figure 3:
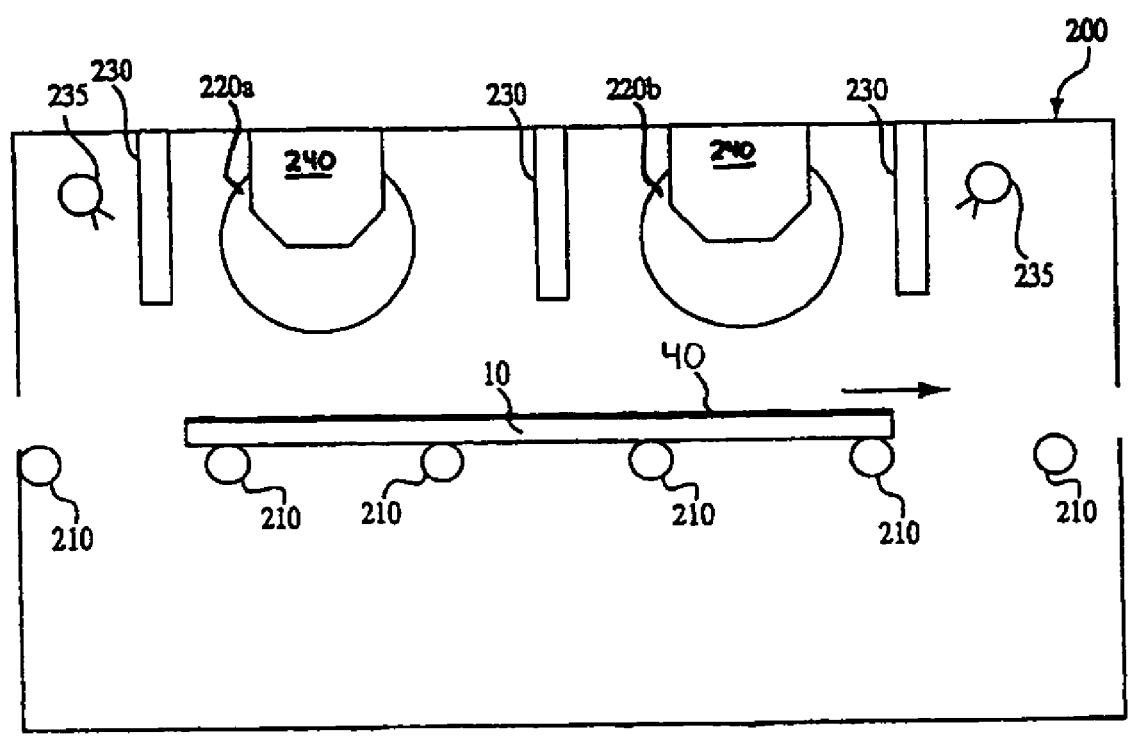
FIG. 3 is a schematic side view of a sputtering chamber that has utility in certain methods of the invention.

The present low solar reflectance coatings 40 can be applied by a variety of well known coating techniques. For example, these coatings can be applied by sputter deposition (i.e., sputtering). Sputtering is well known in the present art. FIG. 3 depicts an exemplary magnetron sputtering chamber 200. Magnetron sputtering chambers and related equipment are commercially available from a variety of sources (e.g., Leybold and BOC Coating Technology). Useful magnetron sputtering techniques and equipment are also described in U.S. Pat. No. 4,166,018, issued to Chapin, the entire teachings of which are incorporated herein by reference.

In favored methods of the invention, the substrate 10 is coated in a multiple-chamber sputtering line. Sputtering lines are well known in the present art. A typical sputtering line includes a series of sputtering chambers (e.g., of the nature depicted in FIG. 3) that are aligned and connected such that a sheet-like substrate 10 can be passed from one chamber to the next by conveying the substrate 10 horizontally over spaced-apart transport rollers 210 in each of the chambers. Thus, the rollers 210 form a continuous path of substrate 10 travel through the sputtering line. The substrate 10 is typically conveyed at speeds of between about 100-500 inches per minute.

In one particular deposition method, the substrate 10 is positioned at the inlet of the sputtering line and conveyed into a first coat zone. The first coat zone is provided with three cathodes adapted to deposit the transparent dielectric inner coat 30. All three of these cathodes comprise zinc sputtering targets. In more detail, each cathode comprises a planar zinc sputtering target. The zinc targets 240 in the first coat zone are sputtered in an oxidizing atmosphere to deposit a zinc oxide inner coat 30. This oxidizing atmosphere may consist essentially of oxygen (e.g., about 100% $O_2$). Alternatively, this atmosphere may comprise $Ar/O_2$ (e.g., at about 3.5 mbar). A power of about 36-37 kW is applied to each of the zinc targets, while the substrate 10 is conveyed beneath all three of these targets at a rate of about 450 inches per minute, such that a zinc oxide inner coat 30 is applied at a thickness of about 129 angstroms.

The substrate 10 is then conveyed into a second coat zone where the high absorption primary layer 80 is applied directly over the inner coat 30. This second coat zone preferably contains an inert atmosphere (e.g., argon at about 4 mbar). One of the sputtering bays in this coat zone has a planar titanium target. A power of about 65-85 kW is applied to the titanium target, while the substrate is conveyed beneath this target at a rate of about 450 inches per minute, to deposit a titanium high absorption primary layer 80 at a thickness of about 130 angstroms. The substrate 10 is then conveyed through four subsequent coat zones to deposit the transparent dielectric middle coat 90, as will now be described.

The thus coated substrate is conveyed through a third coat zone having three sputtering bays each with a planar zinc target, and then through a fourth coat zone also having three sputtering bays each with a planar zinc target. All six of these zinc targets can be sputtered in an oxidizing atmosphere (as described above) to deposit the innermost portion of the middle coat 90. The substrate 10 is conveyed beneath all six of these targets at a rate of about 450 inches per minute, while a power of about 20-37 kW is applied to each zinc target, to deposit about 319 angstroms of zinc oxide directly upon the titanium high absorption primary layer 80. During deposition of this zinc oxide, the outermost portion of the titanium high absorption primary layer 80 is somewhat oxidized, as described above.

The thus coated substrate is then conveyed into a fifth coat zone having three sputtering bays each with two cylindrical (rotatable) substoichiometric titanium oxide targets. Useful substoichiometric titanium oxide targets are described in U.S. patent application Ser. Nos. 09/024,071, 09/024,240, 09/044,681, 09/101,405, and 09/589,098, the entire teachings of each of which are incorporated herein by reference. This fifth coat zone preferably contains an oxidizing atmosphere that is argon and enough oxygen to fully oxidize the titanium dioxide being deposited. A power of about 40.3-67.8 kW is applied to each pair of rotatable targets, while the substrate 10 is conveyed beneath all six of these targets at about 450 inches per minute, such that titanium dioxide is applied at a thickness of about 84 angstroms directly over the zinc oxide that forms the innermost portion of the middle coat 90.

The thus coated substrate is then conveyed into a sixth coat zone wherein the outermost portion of the middle coat 90 is applied. The sixth coat zone has three sputtering bays each with a planar zinc target. The substrate 10 is conveyed beneath all three of these targets at a rate of about 450 inches per minute, while a combined power of about 75-120 kW is applied to the targets, such that zinc oxide is applied directly over the underlying titanium dioxide at a thickness of about 139 angstroms. This 139 angstroms of zinc oxide forms the outermost portion of the middle coat 90.

The substrate 10 is then conveyed into a seventh coat zone wherein the infrared-reflective film 150 and the high absorption blocker layer 180 are deposited. This coat zone preferably contains an inert atmosphere (described above). The first two sputtering bays of this coat zone each have a planar silver target. A combined power of about 10.5-12.5 kW is applied to these two silver targets, while conveying the substrate 10 beneath these targets at about 450 inches per minute, such that a silver infrared-reflective layer 150 is deposited at a thickness of about 134 angstroms. The third sputtering bay of this coat zone has a planar titanium target. A power of about 57.3-82 kW is applied to this titanium target, while the substrate 10 is conveyed beneath this target at a rate of about 450 inches per minute, to deposit the high absorption blocker layer 180 at a thickness of about 114 angstroms. The thus coated substrate is then conveyed through two more coat zones, wherein the outer coat 120 is applied.

The substrate 10 is conveyed through an eighth coat zone that includes three sputtering bays each having one planar zinc target. This coat zone contains an oxidizing atmosphere. A combined power of about 94-114 kW is applied to these three zinc targets, while conveying the substrate 10 beneath these targets at a rate of about 450 inches per minute, such that zinc oxide is applied at a thickness of about 140 angstroms directly over the high absorption blocker layer 180.

The thus coated substrate is then conveyed into a final coat zone used to deposit the outermost portion of the transparent dielectric outer coat 120. This coat zone contains three sputtering bays each having two cylindrical silicon targets (optimally doped with an electrically-conductive material, such as aluminum). A nitriding atmosphere is preferably maintained in this coat zone during sputtering. For example, this atmosphere can be nitrogen at a pressure of about 3.5-5 mbar. A power of about 20 kW is applied to the first pair of these silicon targets, while a power of about 21 kW is applied to the second pair of these silicon targets, and a power of about 24 kW is applied to the last pair of these silicon targets. By conveying the substrate 10 beneath these targets at a rate of about 450 inches per minute, while sputtering each target at the described power level, silicon nitride is deposited at a thickness of about 47 angstroms directly over the underlying zinc oxide. This completes the low solar reflectance coating 40 of one particular embodiment.

While preferred embodiments of the present invention have been described, it should be understood that numerous changes, adaptations, and modifications can be made therein without departing from the spirit of the invention and the scope of the appended claims.

What is claimed is:

1. A method of producing coated substrates, the method comprising:
    a) providing a pane having generally-opposed first and second major surfaces; and
    b) depositing upon one of said major surfaces a low-emissivity coating comprising in sequence outwardly from the pane, an inner coat, a high absorption primary layer, a middle coat, and an infrared-reflective layer, the inner coat being deposited directly onto the pane, wherein said infrared-reflective layer comprises material that is highly reflective of infrared radiation, the high absorption primary layer comprises material that is highly absorptive of solar radiation and includes at least about 100 angstroms of film, the inner coat comprises at least one transparent dielectric film and has an optical thickness, the middle coat comprises at least one transparent dielectric film and has an optical thickness of between about 600 angstroms and about 1,800 angstroms, and wherein the coating has a ratio defined as the optical thickness of the inner coat divided by the optical thickness of the middle coat, said ratio being between about 0.15 and about 0.32.

2. The method of claim 1 wherein the infrared-reflective layer is deposited as a silver-containing film.

3. The method of claim 1 wherein the infrared-reflective layer is deposited as a film having a thickness of at least about 50 angstroms.

4. The method of claim 1 wherein the high absorption primary layer is deposited as a titanium-containing film.

5. The method of claim 4 wherein the high absorption primary layer is deposited as metallic titanium.

6. The method of claim 1 further comprising depositing a high absorption blocker layer between the infrared-reflective layer and the inner coat.

7. The method of claim 6 wherein the high absorption blocker layer is deposited as a titanium-containing film.

8. A method of producing coated substrates, the method comprising:
   a) providing a pane having generally-opposed first and second major surfaces; and
   b) depositing upon one of said major surfaces a low-emissivity coating comprising the following sequence of films:
      i) an inner coat comprising at least one transparent dielectric film, the inner coat being deposited directly on the pane;
      ii) a high absorption primary layer comprising material that is highly absorptive of solar radiation, the high absorption primary layer including at least about 100 angstroms of film;
      iii) a middle coat comprising at least one transparent dielectric film and having an optical thickness of between about 600 angstroms and about 1,800 angstroms;
      iv) an infrared-reflective layer comprising material that is highly reflective of infrared radiation;
      v) a high absorption blocker layer comprising material that is highly absorptive of solar radiation, the high absorption blocker layer being deposited directly over the infrared-reflective layer; and
      vi) an outer coat comprising at least one transparent dielectric film.

9. The method of claim 8 wherein the infrared-reflective layer is deposited as a silver-containing film.

10. The method of claim 8 wherein the infrared-reflective layer is deposited as a film having a thickness of at least about 50 angstroms.

11. The method of claim 8 wherein the high absorption primary layer is deposited as a titanium-containing film.

12. The method of claim 11 wherein the high absorption primary layer is deposited as metallic titanium.

13. The method of claim 8 wherein the high absorption blocker layer is deposited as a titanium-containing film.

14. The method of claim 13 wherein the high absorption blocker layer is deposited as metallic titanium.

15. A method of producing coated substrates, the method comprising:
   a) providing a pane having generally-opposed first and second major surfaces; and
   b) depositing upon one of said major surfaces a low-emissivity coating comprising the following sequence of films:
      i) an inner coat comprising at least one transparent dielectric film;
      ii) a high absorption primary layer comprising material that is highly absorptive of solar radiation, the high absorption primary layer including at least 100 angstroms of film;
      iii) a middle coat comprising a titanium dioxide film sandwiched between two zinc oxide films;
      iv) an infrared-reflective layer comprising material that is highly reflective of infrared radiation;
      v) a high absorption blocker layer comprising material that is highly absorptive of solar radiation, the high absorption blocker layer including at least about 75 angstroms of film; and
      vi) an outer coat comprising at least one transparent dielectric film.

16. A method of producing coated substrates, the method comprising:
   a) providing a pane having generally-opposed first and second major surfaces; and
   b) depositing upon one of said major surfaces a low-emissivity coating comprising the following sequence of films:
      i) an inner coat comprising at least one transparent dielectric film;
      ii) a high absorption primary layer comprising material that is highly absorptive of solar radiation, the high absorption primary layer including at least about 100 angstroms of film;
      iii) a middle coat comprising at least one transparent dielectric film, wherein the middle coat has an optical thickness of between about 600 angstroms and about 1,800 angstroms;
      iv) an infrared-reflective layer comprising silver;
      v) a high absorption blocker layer comprising material that is highly absorptive of solar radiation, the high absorption blocker layer being deposited directly over the infrared-reflective layer; and
      vi) an outer coat comprising at least one transparent dielectric film, wherein the outer coat forms the outermost film region of the coating, wherein the pane is part of an insulating glass unit and the low-emissivity coating is carried on a #2 surface of the insulating glass unit;
   said insulating glass unit having an exterior solar reflectance of less than about 20% and having a transmitted color characterized by an $a_h$ color coordinate and a $b_h$ color coordinate, both of said color coordinates being negative.

17. The method of claim 16 wherein the infrared-reflective layer is deposited as a film having a thickness of at least about 50 angstroms.

18. The method of claim 16 wherein the high absorption primary layer is deposited as a titanium-containing film.

19. The method of claim 18 wherein the high absorption primary layer is deposited as metallic titanium.

20. The method of claim 16 wherein the high absorption blocker layer is deposited as a titanium-containing film.

21. The method of claim 20 wherein the high absorption blocker layer is deposited as metallic titanium.

22. A method of producing coated substrates, the method comprising:
   A) providing a pane having generally-opposed first and second major surfaces; and
   b) depositing upon one of said major surfaces a low-emissivity coating comprising the following sequence of films:
      i) an inner coat comprising at least one transparent dielectric film and having an optical thickness, the inner coat being deposited directly on the pane;
      ii) a high absorption primary layer comprising material that is highly absorptive of solar radiation, the high absorption primary layer including at least about 100 angstroms of film;
      iii) a middle coat comprising at least one transparent dielectric film and having an optical thickness;
      iv) an infrared-reflective layer comprising silver;
      v) a high absorption blocker layer comprising material that is highly absorptive of solar radiation, the high absorption blocker layer being deposited directly over the infrared-reflective layer; and
      vi) an outer coat comprising at least one transparent dielectric film, wherein the outer coat forms the outermost film region of the coating, wherein the coating has a ratio defined as the optical thickness of the inner coat divided by the optical thickness of the middle coat, said ratio being between about 0.15 and 0.32;

wherein the pane is part of an insulating glass unit and the low-emissivity coating is carried on a #2 surface of the insulating glass unit; and wherein the insulating glass unit has an exterior solar reflectance of less than about 20% and a transmitted color characterized by an $a_h$ color coordinate and a $b_h$ color coordinate, both of said color coordinates being negative.

* * * * *